United States Patent
Takagi

(10) Patent No.: US 9,930,680 B2
(45) Date of Patent: Mar. 27, 2018

(54) INTERFERENCE IDENTIFYING DEVICE, WIRELESS COMMUNICATION APPARATUS, AND INTERFERENCE IDENTIFYING METHOD

(71) Applicant: Mitsubishi Electric Corporation, Chiyoda-ku (JP)

(72) Inventor: Manabu Takagi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/503,965

(22) PCT Filed: Jul. 3, 2015

(86) PCT No.: PCT/JP2015/069329
§ 371 (c)(1),
(2) Date: Feb. 14, 2017

(87) PCT Pub. No.: WO2016/035439
PCT Pub. Date: Mar. 10, 2016

(65) Prior Publication Data
US 2017/0295581 A1    Oct. 12, 2017

(30) Foreign Application Priority Data
Sep. 5, 2014    (JP) .................................. 2014-181391

(51) Int. Cl.
*H04B 1/00* (2006.01)
*H04W 72/08* (2009.01)
(Continued)

(52) U.S. Cl.
CPC ........ *H04W 72/082* (2013.01); *H04B 17/345* (2015.01); *H04W 72/0446* (2013.01); *H04W 72/0453* (2013.01)

(58) Field of Classification Search
CPC .. H04B 1/7136; H04B 1/7143; H04B 1/7156; H04B 2001/71367; H04B 2001/71563;
(Continued)

(56) References Cited

U.S. PATENT DOCUMENTS 5,144,642 A     9/1992 Weinberg et al.
5,463,716 A  * 10/1995 Taguchi .............. G10L 19/0204
                                                   704/205
(Continued)

FOREIGN PATENT DOCUMENTS

JP    2012-47724 A    3/2012
JP    2012-118017 A   6/2012
(Continued)

OTHER PUBLICATIONS

Extended European Search Report dated Jul. 3, 2017 in Patent Application No. 15838668.0.
(Continued)

*Primary Examiner* — Ajibola Akinyemi
(74) *Attorney, Agent, or Firm* — Oblon, McClelland, Maier & Neustadt, L.L.P.

(57) ABSTRACT

An interference identifying device includes a receiver to receive a reception signal obtained by reception of an electromagnetic wave, a frequency converter to calculate, using the reception signal, matrix data indicating complex amplitude at each time and frequency of the reception signal, an autocorrelation-value calculator to calculate, using the matrix data, a correlation value between a frequency distribution at first time and a frequency distribution at second time, and an identifier to identify characteristics of an interference signal using the correlation value.

12 Claims, 21 Drawing Sheets

(51) Int. Cl.
*H04B 17/345* (2015.01)
*H04W 72/04* (2009.01)
(58) Field of Classification Search
CPC .... H04B 1/1027; H04B 1/707; H04B 1/7087;
H04B 2201/709709; H04B 7/2668;
H04W 24/00; H04W 48/16; H04W 56/00
USPC ........................................................ 455/63.1
See application file for complete search history.

(56) References Cited

U.S. PATENT DOCUMENTS

| | | | |
|---|---|---|---|
| 7,676,046 B1 | 3/2010 | Nelson et al. | |
| 8,768,260 B2 | 7/2014 | Tsukamoto et al. | |
| 2002/0196767 A1* | 12/2002 | Sim ...................... | H04B 7/0842 370/342 |
| 2008/0144756 A1* | 6/2008 | Park ...................... | H04B 1/7075 375/359 |
| 2012/0327822 A1 | 12/2012 | Arakawa | |
| 2013/0148766 A1 | 6/2013 | Urabe et al. | |

FOREIGN PATENT DOCUMENTS

| | | |
|---|---|---|
| JP | 2012-213027 A | 11/2012 |
| JP | 2014-45354 A | 3/2014 |
| WO | 2011/105516 A1 | 9/2011 |

OTHER PUBLICATIONS

Combined Chinese Office Action and Search Report dated Jul. 31, 2017 in Patent Application No. 201580046855.0 (with English Translation and English Translation of Category of Cited Documents).

International Search Report and Written Opinion of the International Searching Authority dated Sep. 1, 2015 in PCT/JP2015/069329 filed Jul. 3, 2015.

* cited by examiner

FIG.24
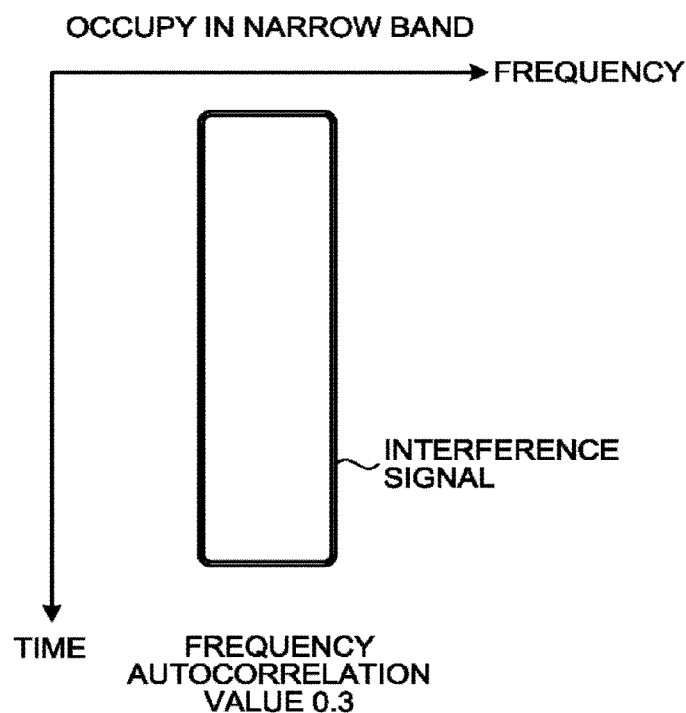
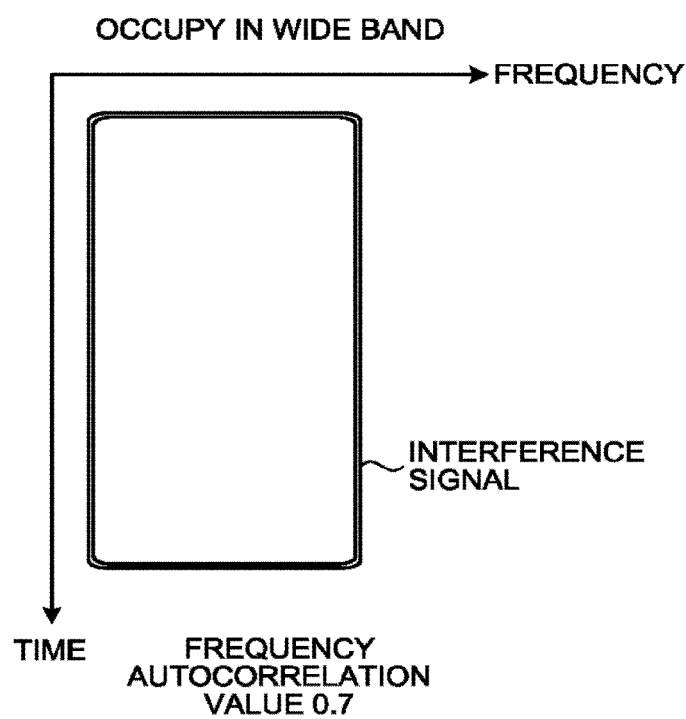

FIG.27
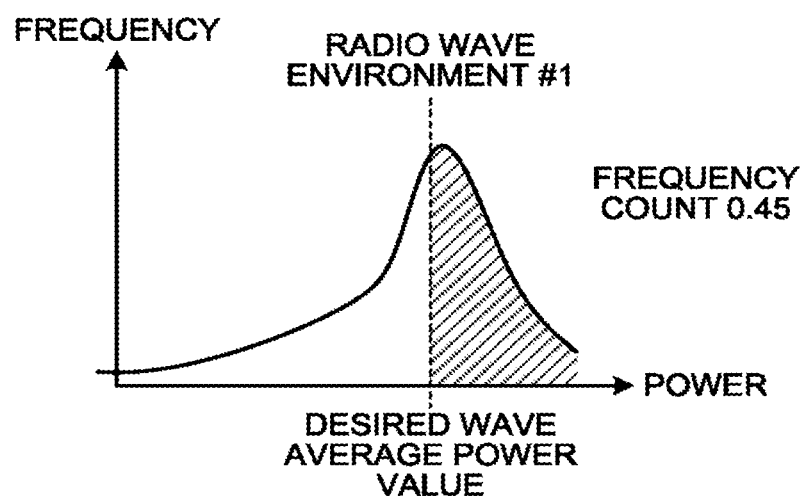
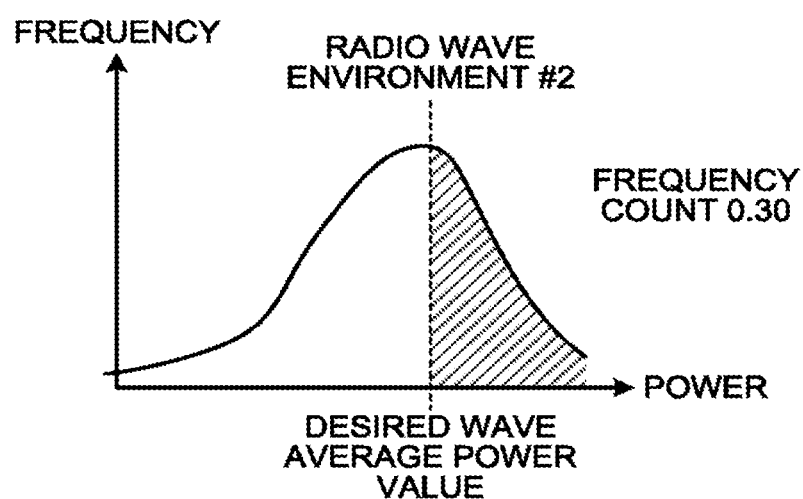

INTERFERENCE IDENTIFYING DEVICE, WIRELESS COMMUNICATION APPARATUS, AND INTERFERENCE IDENTIFYING METHOD

FIELD

The present invention relates to an interference identifying device, a wireless communication apparatus, and an interference identifying method for measuring a radio wave environment and identifying an interference signal.

BACKGROUND

In recent years, according to the rapid development of wireless communication, insufficiency of usable frequencies is becoming a serious problem. Therefore, it is desired to effectively use frequencies. As a method of effectively using frequencies, there is a method of performing transmission in an optimum wireless communication system adapted to a radio wave environment. When the wireless communication system adapted to the radio wave environment is selected, an interference identifying device that extracts characteristics of an interference signal in the radio wave environment and identifies the interference signal plays an important role. There have been proposed various systems concerning the interference identifying device.

The interference identifying device in the past calculates, with respect to radio wave environment measurement data, amplitude information such as an amplitude probability distribution as a feature value of a waveform of an interference signal and compares the amplitude information and a threshold to thereby estimate presence or absence of occurrence of interference with a communication signal. See, for example, Patent Literature 1.

For example, as disclosed in Patent Literature 2, there has been proposed a method of acquiring a peak value of noise with respect to a frequency used by a wireless apparatus, if the peak value is equal to or smaller than a reference value, determining that communication can be performed, and securing the quality of communication.

CITATION LIST

Patent Literature

Patent Literature 1: Japanese Patent Application Laid-Open No. 2012-47724
Patent Literature 2: Japanese Patent Application Laid-Open No. 2014-45354

SUMMARY

Technical Problem

However, the interference identifying device described in Patent Literature 1 estimates presence or absence of occurrence of interference with a communication signal using a plurality of kinds of amplitude information as feature values of interference. The interference identifying device described in Patent Literature 2 determines presence or absence of interference on the basis of a peak value of noise. It is difficult to estimate, only with the amplitude information or only with the peak value of noise, even characteristics of an interference signal such as the duration of an interference signal, whether an interference signal occupying a specific frequency for a long time is present, and whether a frequency-hopping interference signal is present. On the other hand, to select an optimum communication system corresponding to an acquired radio wave environment, it is necessary to grasp more detailed characteristics of an interference signal such as characteristics in a time domain indicating a temporal change and characteristics in a frequency domain. Therefore, there is a problem in that an appropriate communication system cannot be selected by the technologies described in Patent Literature 1 and Patent Literature 2.

The present invention has been devised in view of the above and an object of the present invention is to obtain an interference identifying device capable of identifying characteristics in a time domain and a frequency domain of an interference signal.

Solution to Problem

In order to solve the aforementioned problem and achieve the object, the present invention provides an interference identifying device including: an acquiring unit to acquire a reception signal obtained by reception of an electromagnetic wave; a frequency converting unit to calculate, using the reception signal, matrix data indicating complex amplitude at each time and frequency of the reception signal; an autocorrelation-value calculating unit to calculate, using the matrix data, a correlation value between a frequency distribution at first time and a frequency distribution at second time; and an identifying unit to identify characteristics of an interference signal using the correlation value.

Advantageous Effects of Invention

The interference identifying device according to the present invention achieves an effect that it is possible to identify characteristics in a time domain and a frequency domain of an interference signal.

BRIEF DESCRIPTION OF DRAWINGS

FIG. 24 is a diagram showing an example of a frequency autocorrelation value at each bandwidth of a specific frequency occupied by an interference signal.

FIG. 27 is a diagram showing an example of a frequency distribution in which power values exceeding an average power value of a desired wave are counted.

DESCRIPTION OF EMBODIMENTS

Interference identifying devices, wireless communication apparatuses, and interference identifying methods according to embodiments of the present invention are explained in detail below with reference to the drawings. Note that the invention is not limited by the embodiments.

First Embodiment

Figure 1:
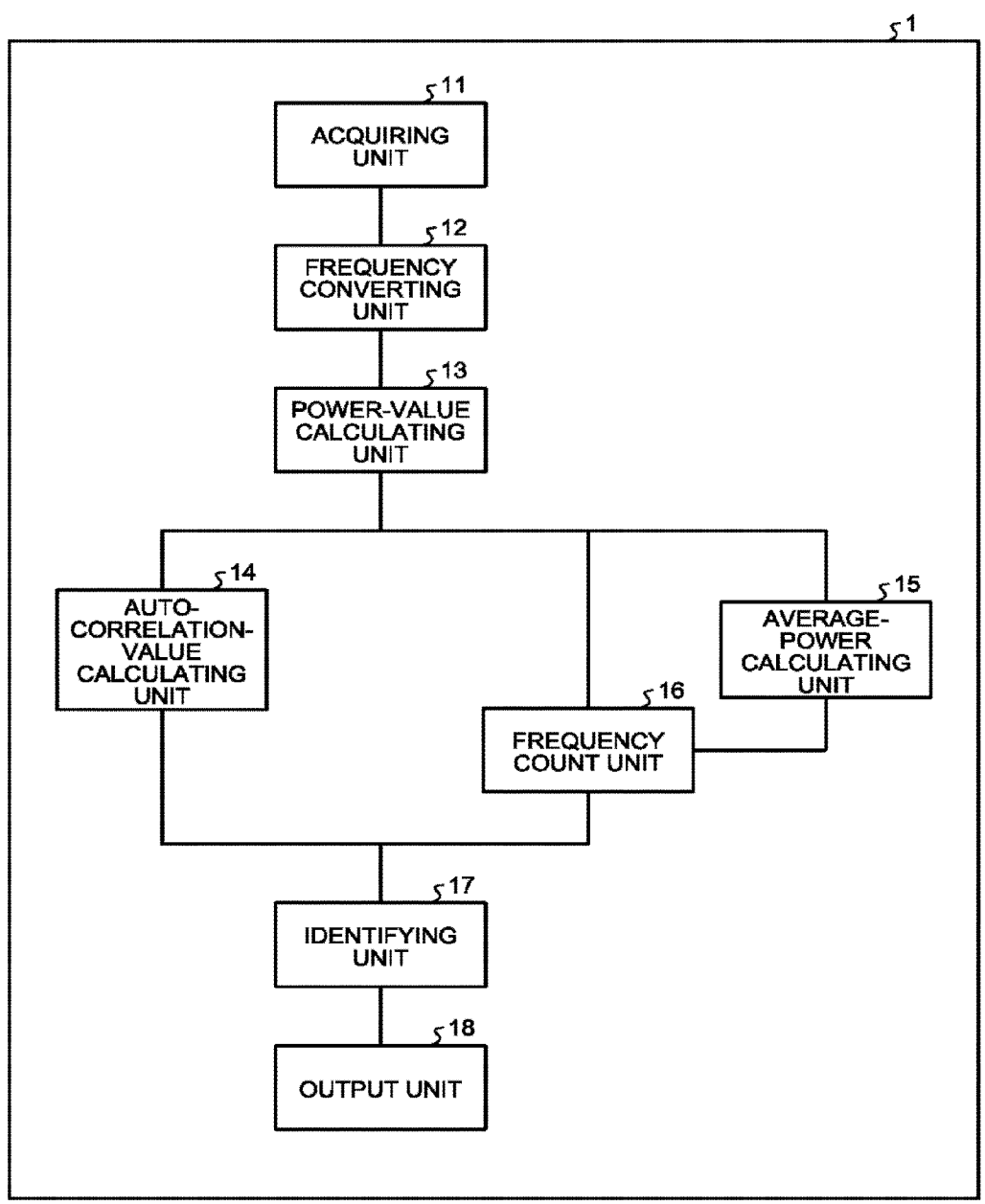
FIG. 1 is a diagram showing a configuration example of an interference identifying device according to a first embodiment.

FIG. 1 is a diagram showing a configuration example of an interference identifying device according to a first embodiment of the present invention. As shown in FIG. 1, an interference identifying device 1 in this embodiment includes an acquiring unit 11 that receives an electromagnetic wave and acquires time waveform data, which is a reception signal, a frequency converting unit 12 that performs STFT (Short-Time Fourier Transform) on the time waveform data to thereby convert the time waveform data into matrix data of time, a frequency, and complex amplitude, a power-value calculating unit 13 that calculates power values from the complex amplitude of the matrix data, an autocorrelation-value calculating unit 14 that calculates an autocorrelation value using the matrix data, an average-power calculating unit 15 that calculates an average power value using the matrix data, a frequency count unit 16 that counts, using the average power value, power values at frequencies and times exceeding the average power value, an identifying unit 17 that identifies characteristics of an interference signal from the autocorrelation value, the frequency count, and the average power value, and an output unit 18 that outputs an identification result of the interference signal.

When the interference identifying device 1 is configured as an independent device or when the interference identifying device 1 is mounted in an apparatus not having a wireless communication function, the acquiring unit 11 includes a functional unit capable of receiving an electromagnetic wave such as a reception antenna and receives the electromagnetic wave with the reception antenna or the like.

Operation is explained. First, the acquiring unit 11 receives an electromagnetic wave using the reception antenna or the like, samples a reception signal in every fixed time, and inputs time waveform data, which is a digital signal, to the frequency converting unit 12. The frequency converting unit 12 performs the STFT on the time waveform data input from the acquiring unit 11 and inputs matrix data, which is a result of the STFT, to the power-value calculating unit 13. The STFT is processing for repeatedly carrying out, while shifting time, Fourier transform of data in a fixed period. A temporal change of a spectrum can be calculated by the STFT. Elements of matrix data obtained by the STFT represent complex amplitudes. Therefore, the matrix data obtained by the STFT is complex amplitude at each time and each frequency of the reception signal.

Specifically, the STFT is processing indicated by Expression (1) described below. Note that time is represented as t, a discretized frequency is represented as f, x(t) represents a reception signal, which is an input, and h(t) represents a window function. When $\pi$ represents a ratio of the circumference of a circle to its diameter, $\omega = 2\pi f$.

[Math 1]

$$X(t, f) = \int_{-\infty}^{\infty} h(\tau - t) \times (\tau) e^{-j\omega\tau} d\tau \quad (1)$$

The above Expression (1) is an expression at the time when t and f are continuous. However, when t represents a value indicating a number of discretized time and f represents a value indicating a number of a discretized frequency, the STFT in a finite section of t=1 to t=N, that is, a finite section from a first sampling point to an N-th sampling point can be indicated by Expression (2) described below. N represents an integer equal to or larger than 2.

[Math 2]

$$X(t, f) = \sum_{\tau=1}^{N} h(\tau - t) \times (\tau) e^{-j\omega\tau} \quad (2)$$

Matrix data in which X(t, f) is arranged in the longitudinal direction from t=1 to t=nt and arranged in the lateral direction from f=1 to f=nf as indicated by Expression (3) described below is obtained by the STFT. In the expression, nt represents the number of rows of the matrix data and nf represents the number of columns of the matrix data.

[Math 3]

$$\begin{bmatrix} X(1,1) & X(1,2) & \cdots & X(1, nf) \\ \vdots & & & \vdots \\ X(nt, 1) & X(nt, 2) & \cdots & X(nt, nf) \end{bmatrix} \quad (3)$$

Subsequently, the power-value calculating unit 13 converts complex amplitudes, which is elements of the matrix data input from the frequency converting unit 12, respectively into power values. Specifically, the power-value calculating unit 13 squares complex amplitude X(t, f), which is an element of a t-th column and an f-th row, to thereby convert the complex amplitude X (t, f) into a power value. Matrix data P after being converted into the power value can be represented by Expression (4) described below. A row direction of the matrix data P represents a frequency and a column direction of the matrix data P represents time. An element $P_{t,f}$ of the matrix data indicates a power value at time t, which is time indicated by a sampling number, and a frequency f, which is a frequency indicated by a number of data after Fourier transform.

[Math 4]

$$P = \begin{bmatrix} P_{1,1} & \cdots & P_{1,nf} \\ \vdots & \ddots & \vdots \\ P_{nt,1} & \cdots & P_{nt,nf} \end{bmatrix} \quad (4)$$

The power-value calculating unit 13 inputs the matrix data after being converted into the power value to the autocorrelation-value calculating unit 14, the average-power calculating unit 15, and the frequency count unit 16. The autocorrelation-value calculating unit 14 calculates an autocorrelation value using the matrix data input from the power-value calculating unit 13 and inputs the calculated autocorrelation value to the identifying unit 17. The average-power calculating unit 15 calculates an average power value using the matrix data input from the power-value calculating unit 13 and inputs the calculated average power value to the frequency count unit 16. Specifically, the average-power calculating unit 15 calculates a sum of the elements Pt,f of the matrix data shown in Expression (4) and calculates an average power value by dividing the calculated sum by the number of elements of the matrix data, that is, nf×nt. The frequency count unit 16 counts power values exceeding the average power value using the matrix data input from the power-value calculating unit 13 and the average power value input from the average-power calculating unit 15 and inputs a frequency count, which is a counting result, and the average power value to the identifying unit 17. The identifying unit 17 identifies characteristics of an interference signal using the autocorrelation value input from the autocorrelation-value calculating unit 14 and the frequency count and the average power value input from the frequency counter unit 16 and inputs an identification result to the output unit 18. The output unit 18 outputs the identification result input from the identifying unit 17.

Figure 2:
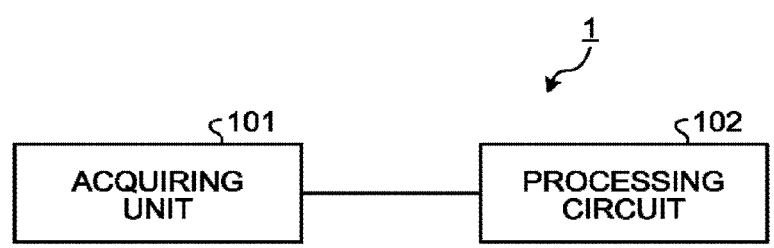
FIG. 2 is a diagram showing a hardware configuration example of the interference identifying device in the first embodiment.

FIG. 2 is a diagram showing a hardware configuration example of the interference identifying device 1 in this embodiment. As shown in FIG. 2, the interference identifying device 1 is configured by an acquiring unit 101 corresponding to the acquiring unit 11 shown in FIG. 1 and a processing circuit 102. The acquiring unit 101 is configured by, for example, a device that receives an electromagnetic wave such as an antenna and an electronic circuit that performs processing such as amplification and noise removal on the received electromagnetic wave and outputs electric power of the received electromagnetic wave as a digital signal sampled at every fixed time. The frequency converting unit 12, the power-value calculating unit 13, the autocorrelation-value calculating unit 14, the average-power calculating unit 15, the frequency count unit 16, and the identifying unit 17 shown in FIG. 1 are realized by the processing circuit 102.

The processing circuit 102 can be dedicated hardware or can be a control circuit including a memory and a CPU (also referred to as Central Processing Unit, central processing device, processing device, arithmetic device, microprocessor, microcomputer, processor, or DSP (Digital Signal Processor) that executes programs stored in the memory. The memory corresponds to, for example, a nonvolatile or volatile semiconductor memory such as a RAM (Random Access Memory), a ROM (Read Only Memory), a flash memory, an EPROM (Erasable Programmable Read Only Memory), or an EEPROM (Electrically Erasable Programmable Read Only Memory), a magnetic disk, a flexible disk, an optical disk, a compact disk, a minidisk, or a DVD (Digital Versatile Disk).

When the processing circuit 102 is realized by the dedicated hardware, the dedicated hardware is, for example, a single circuit, a complex circuit, a programmed processor, a parallel-programmed processor, an ASIC (Application Specific Integrated Circuit), a FPGA (Field Programmable Gate Array), or a combination of the foregoing.

Figure 3:
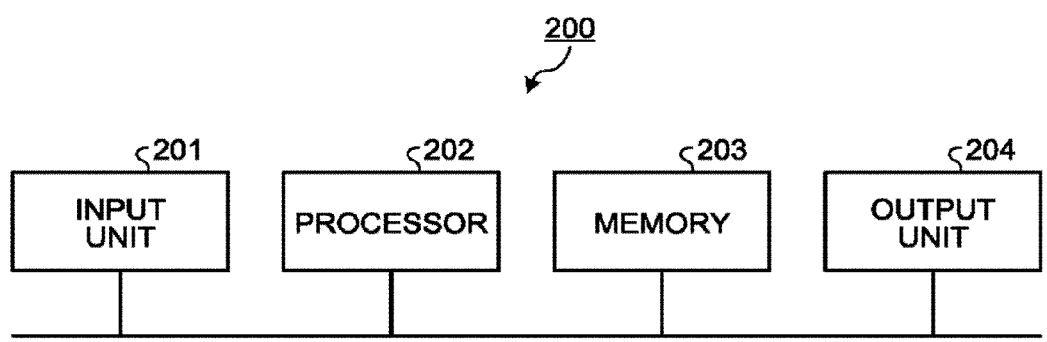
FIG. 3 is a diagram showing a configuration example of a control circuit.

When the processing circuit 102 is realized by the control circuit including the CPU, the control circuit is, for example, a control circuit 200 having a configuration shown in FIG. 3. FIG. 3 is a diagram showing a configuration example of the control circuit 200. As shown in FIG. 3, the control circuit 200 includes an input unit 201, which is a receiving unit that receives data input from the outside, and is an input port and an interface circuit, a processor 202, which is a CPU, a memory 203, and an output unit 204, which is a transmitting unit that transmits data to the outside. The input unit 201 is an interface circuit that receives data input from the outside of the control circuit 200 and gives the data to the processor 202. The output unit 204 is an interface circuit that transmits data to the outside. When the processing circuit 102 is realized by the control circuit 200 shown in FIG. 3, the processing circuit 102 is realized by the processor 202 reading out and executing programs corresponding to respective kinds of processing of the frequency converting unit 12, the power-value calculating unit 13, the autocorrelation-value calculating unit 14, the average-power calculating unit 15, the frequency count unit 16, and the identifying unit 17 stored in the memory 203. The memory 203 is used as a temporary memory in the processing carried out by the processor 202.

Note that, in FIG. 2, the frequency converting unit 12, the power-value calculating unit 13, the autocorrelation-value calculating unit 14, the average-power calculating unit 15, the frequency count unit 16, and the identifying unit 17 are realized by one processing circuit 102. However, the frequency converting unit 12, the power-value calculating unit 13, the autocorrelation-value calculating unit 14, the average-power calculating unit 15, the frequency count unit 16, and the identifying unit 17 can be individually configured as processing circuits. In this case, the processing circuits can be dedicated hardware or can be realized by the control circuit 200 shown in FIG. 3. Two or more of the frequency converting unit 12, the power-value calculating unit 13, the autocorrelation-value calculating unit 14, the average-power calculating unit 15, the frequency count unit 16, and the identifying unit 17 can be realized by one control circuit 200.

Figure 4:
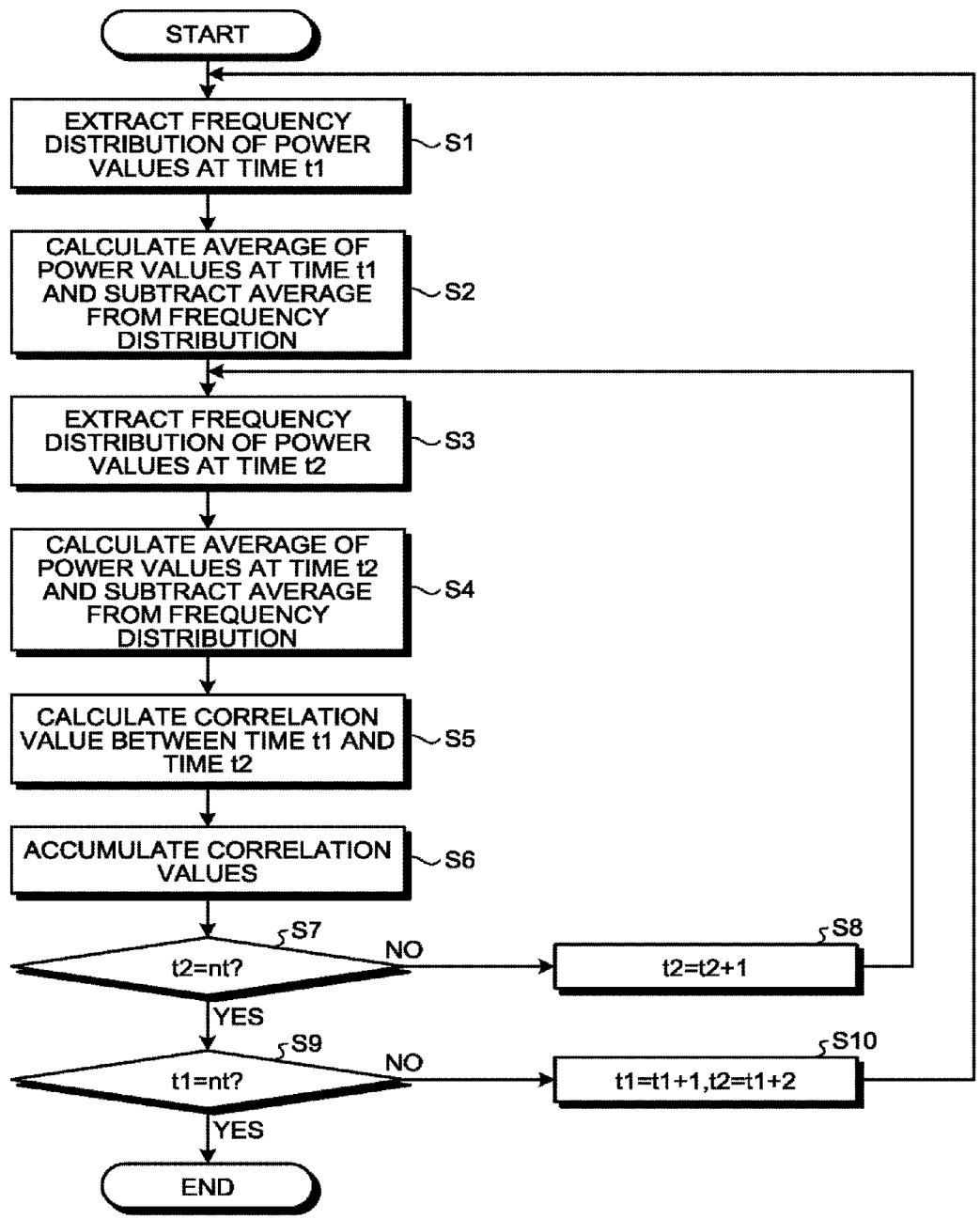
FIG. 4 is a flowchart showing an example of a calculation procedure for an autocorrelation value in an autocorrelation-value calculating unit in the first embodiment.

FIG. 4 is a flowchart showing an example of a calculation procedure for an autocorrelation value in the autocorrelation-value calculating unit 14 in this embodiment. As shown in FIG. 4, first, the autocorrelation-value calculating unit 14 extracts, from matrix data, a vector $v_{t1}=(P_{t1, 1}, P_{t1, 1}, \ldots, P_{t1, nf})$, which is a frequency distribution of power values at time t1, which is first time (step S1). Subsequently, the autocorrelation-value calculating unit 14 calculates an average $mP_{t1}$ of the power values at time t1 and subtracts the average from the frequency distribution (step S2). Specifically, the autocorrelation-value calculating unit 14 calculates the average $mP_{t1}$ of elements of the vector $v_{t1}$ and calculates a vector $v=(P_{t1, 1}-mP_{t1}, P_{t1, 1}-mP_{t1}, \ldots, P_{t1, nf}-mP_{t1})$ using the vector $v_{t1}$ and the average $mP_{t1}$.

Similarly, the autocorrelation-value calculating unit 14 extracts, from the matrix data, a vector $v_{t2}=(P_{t2, 1}, P_{t2, 1}, \ldots, P_{t2, nf})$, which is a frequency distribution of power values at time t2, which is second time (step S3). Subsequently, the autocorrelation-value calculating unit 14 calculates an average $mP_{t2}$ of the power values at time t2 and subtracts the average from the frequency distribution (step S4). Specifically, the autocorrelation-value calculating unit 14 calculates a vector $w=(P_{t2, 1}-mP_{t2}, P_{t2, 1}-mP_{t2}, \ldots, P_{t2, nf}-mP_{t2})$ using the vector $v_{t2}$ and the average $mP_{t2}$.

Subsequently, the autocorrelation-value calculating unit 14 calculates a correlation value between the time t1 and the time t2 (step S5). Specifically, the autocorrelation-value calculating unit 14 calculates a correlation value R according to Expression (5) described below using the vectors v and w. Note that · represents an inner product and * represents multiplication.

[Math 5]

$$R = \frac{v \cdot w}{|v| * |w|} \quad (5)$$

Subsequently, the autocorrelation-value calculating unit 14 accumulates correlation values (step S6). Specifically, the autocorrelation-value calculating unit 14 calculates an accumulation value $R_{sum}=R+R_{sum}$. Note that 0 is set as $R_{sum}$ in an initial state. For example, $R_{sum}=0$ is set before step S1.

Subsequently, the autocorrelation-value calculating unit 14 determines whether t2 is equal to nt (step S7). When determining that t2 is not equal to nt (No at step S7), the autocorrelation-value calculating unit 14 sets t2=t2+1 (step S8) and returns to step S3. As shown in Expression (1), nt is a maximum of times, that is, a number of discretized times in the matrix data. When determining at step S7 that t2 is equal to nt (Yes at step S7), the autocorrelation-value calculating unit 14 determines whether t1 is equal to nt (step S9). When determining at step S9 that t1 is not equal to nt (No at step S9), the autocorrelation-value calculating unit 14 sets t1=t1+1 and sets t2=t1+2 (step S10) and returns to step S1. When determining at step S9 that t1 is equal to nt (Yes at step S9), the autocorrelation-value calculating unit 14 ends the processing.

According to the processing explained above, the autocorrelation-value calculating unit 14 calculates correlation values of all combinations of times in the matrix data and calculates an accumulation value of the correlation values. A number nc of the combinations of the times is nc=$_{nt}C_2$ when the number of times is represented as nt. Note that $_xC_y$ indicates the number of combinations for selecting different y pieces from x pieces. The autocorrelation-value calculating unit 14 inputs the accumulation value obtained by the processing to the identifying unit 17 as an autocorrelation value.

Figure 5:
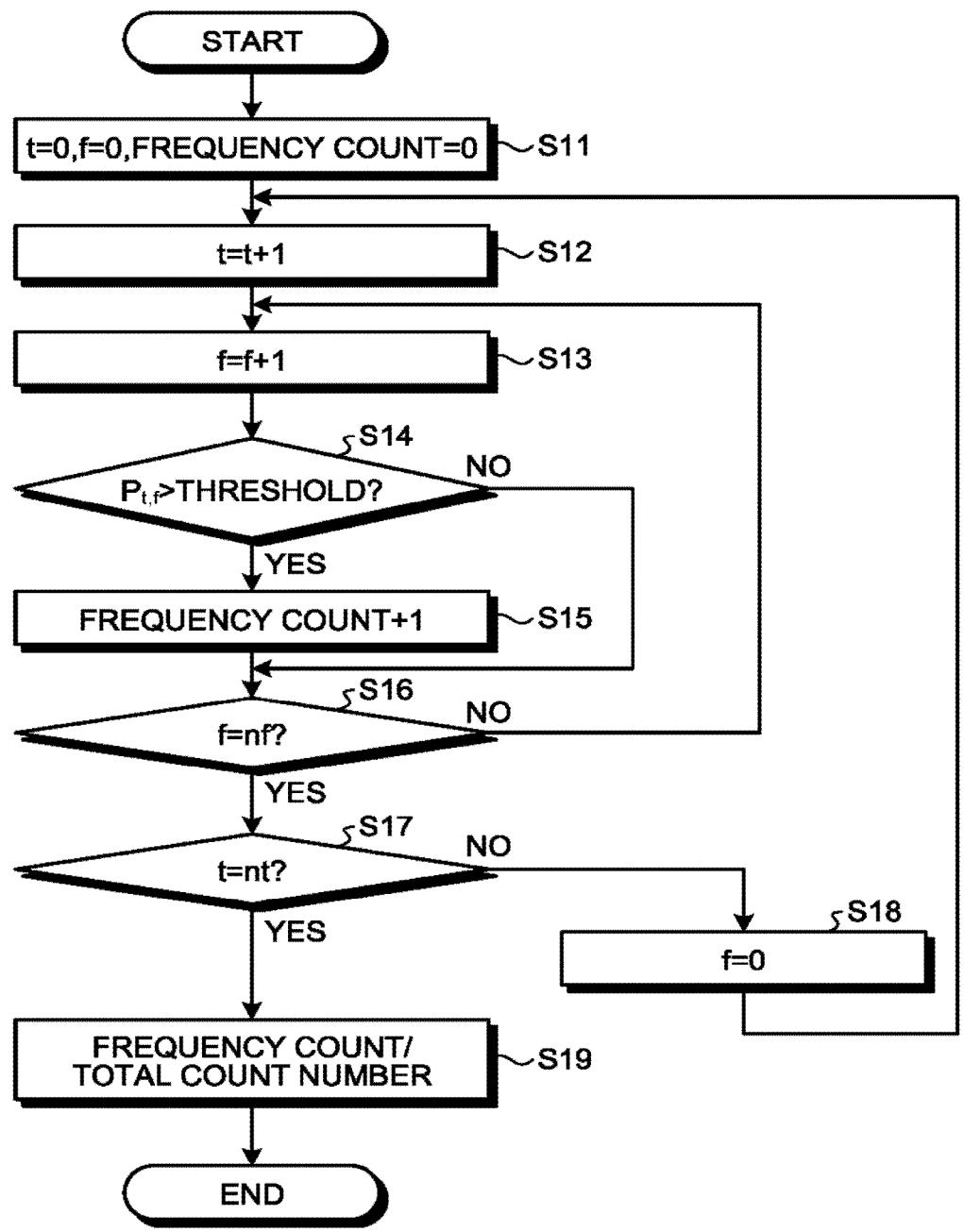
FIG. 5 is a flowchart showing an example of a counting processing procedure for power values in a frequency count unit in the first embodiment.

FIG. 5 is a flowchart showing an example of a counting processing procedure for power values in the frequency count unit 16 in this embodiment. First, the frequency count unit 16 sets a variable t indicating time to 0, sets a variable f indicating a frequency to 0, and sets a frequency count to 0 (step S11). Subsequently, the frequency count unit 16 sets t=t+1 (step S12) and sets f=f+1 (step S13).

The frequency count unit 16 determines whether the power value $P_{t,f}$ of the matrix data is larger than a threshold (step S14). As the threshold, an average power value input from the average-power calculating unit 15 is used. When determining that the power value $P_{t,f}$ of the matrix data is larger than the threshold (Yes at step S14), the frequency count unit 16 increases the frequency count by 1 (step S15). Subsequently, the frequency count unit 16 determines whether f is equal to nf (step S16). As shown in Expression (1), nf is a maximum of frequencies in the matrix data, that is, a number of discretized frequencies. When determining that f is equal to nf (Yes at step S16), the frequency count unit 16 determines whether t is equal to nt (step S17). When determining that t is not equal to nt (No at step S17), the frequency count unit 16 sets f=0 (step S18) and returns to step S12.

When determining at step S14 that the power value $P_{t,f}$ of the matrix data is equal to or smaller than the threshold (No a step S14), the frequency count unit 16 proceeds to step S16. When determining at step S16 that f is not equal to nf (No at step S16), the frequency count unit 16 returns to step S13. When determining at step S17 that t is equal to nt (Yes at step S17), the frequency count unit 16 performs normalization by dividing the frequency count by a total count number, that is, the number of elements of the matrix data (step S19) and ends the processing.

Figure 6:
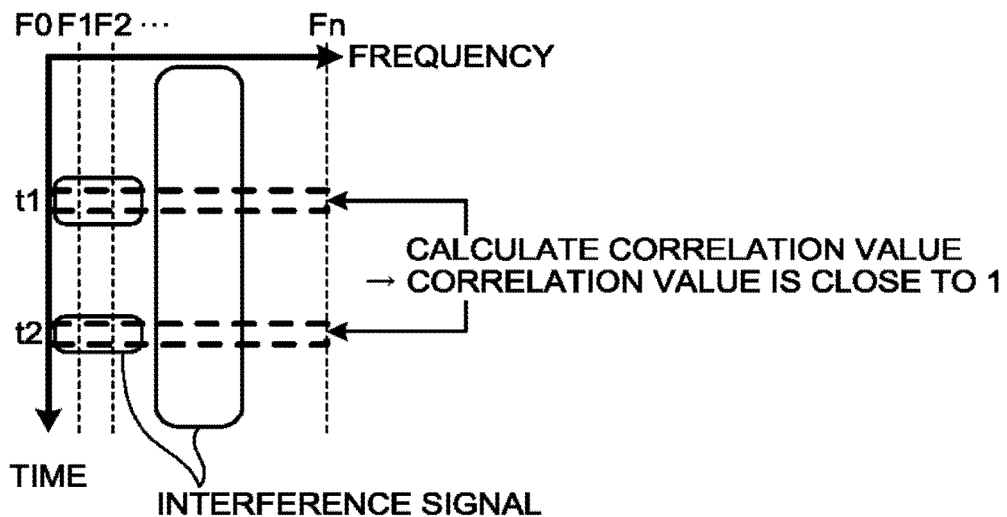
FIG. 6 is a diagram showing an example of a correlation value calculated by the autocorrelation-value calculating unit when an interference signal occupies a specific frequency.
Figure 7:
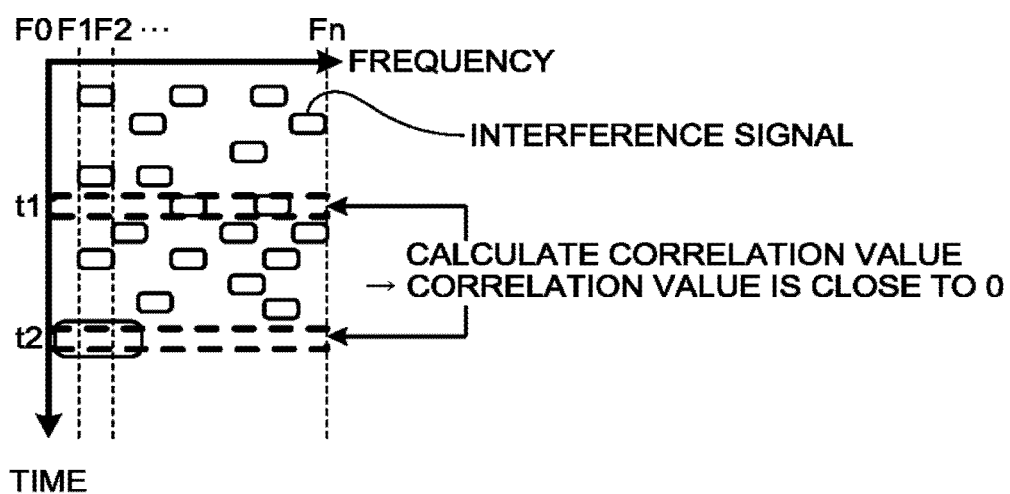
FIG. 7 is a diagram showing an example of a correlation value calculated by the autocorrelation-value calculating unit when an interference signal is frequency-hopping.
Figure 8:
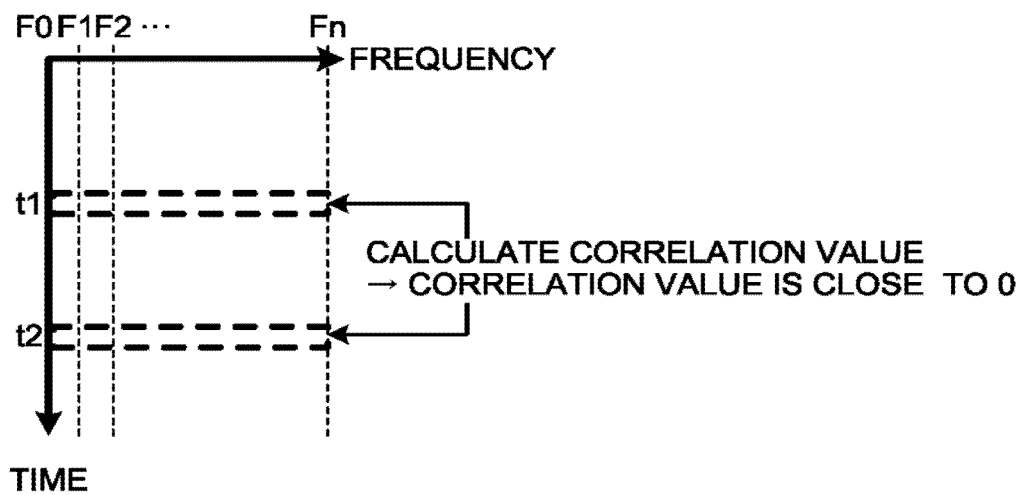
FIG. 8 is a diagram showing an example of a correlation value calculated by the autocorrelation-value calculating unit when an interference signal is absent.
Figure 9:
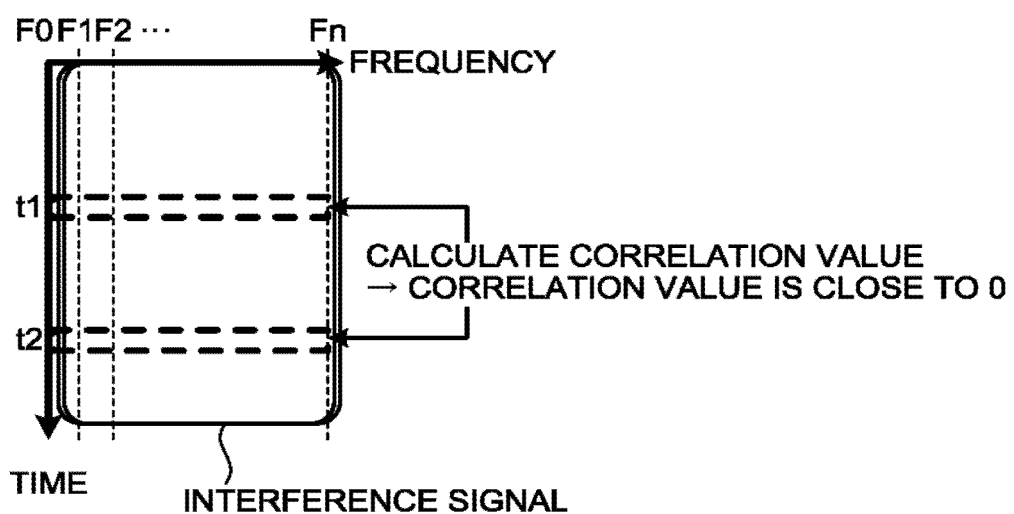
FIG. 9 is a diagram showing an example of a correlation value calculated by the autocorrelation-value calculating unit when an interference signal is present at all frequencies and all times.

An identification method for characteristics of an interference signal performed by the identifying unit 17 is explained. FIG. 6 to FIG. 9 are diagrams showing examples of correlation values calculated by the autocorrelation-value calculating unit 14. FIG. 6 shows a correlation value at the time when an interference signal occupies a specific frequency. FIG. 7 shows a correlation value at the time when an interference signal is frequency-hopping. FIG. 8 shows a correlation value at the time when an interference signal is absent. FIG. 9 shows a correlation value at the time when an interference signal is present at all frequencies and all times.

In FIG. 6 to FIG. 9, the vertical axis indicates time and the horizontal axis indicates a frequency. In FIG. 6 to FIG. 9, a region surrounded by a rounded rectangle indicates a portion where an interference signal is present. In FIG. 6 to FIG. 9, a first frequency of the matrix data is represented as F0, a second frequency is represented as F1, . . . , and an nf-th frequency is represented as Fn. Portions surrounded by thick broken lines extending in the lateral direction in portions of the time t1 and the time t2 indicate portions equivalent to the two vectors v and w set as targets of one calculation of correlation values.

In the example shown in FIG. 6, interference signals having frequencies F1 and F2 are present at the time t1 and the time t2. An interference signal is present at the time t1 and the time t2 even in a frequency domain higher than F2. In this way, when an interference signal having a specific frequency is present, the correlation value calculated using the vectors v and w at the time t1 and the time t2 is close to 1. The correlation value calculated using the vectors v and w at the time t1 and the time t2 indicates similarity of a frequency of a power value of the interference signal and time. The similarity, that is, correlation is high when the interference signal occupies the specific frequency.

In the example shown in FIG. 7, because the interference signal is frequency-hopping, the frequency of the interference signal is different depending on the time. The correlation value calculated using the vectors v and w at the time t1 and the time t2 is close to 0. In the example shown in FIG. 8, because an interference signal is absent, the correlation value calculated using the vectors v and w at the time t1 and the time t2 is close to 0. In the example shown in FIG. 9, because the interference signal is present at all frequencies and all times, the correlation value calculated using the vectors v and w at the time t1 and the time t2 is close to 0. Therefore, the identifying unit 17 can determine, by determining whether a result obtained by dividing an autocorrelation value, which is accumulation of correlation values, by a total number of the correlation values is close to a fixed value, whether the interference signal occupies the specific frequency. Specifically, for example, the identifying unit 17 determines, on the basis of whether the absolute value of a difference between a result $R_d$ obtained by dividing the autocorrelation value, which is the accumulation of the correlation values, by the total number of the correlation values and $R_c$, which is the fixed value, is equal to or smaller than a threshold, whether the interference signal occupies the specific frequency. As the threshold, a value such as 0.1 can be set. The identifying unit 17 can determine, on the basis of whether $R_d$ is equal to or larger than $R_c$, whether the interference signal occupies the specific frequency. Note that the fixed value is a value equal to or larger than 0 and equal to or smaller than 1 and is set to a numerical value equal to or lager than 0.5 and smaller than 1 such as 0.8.

Figure 10:
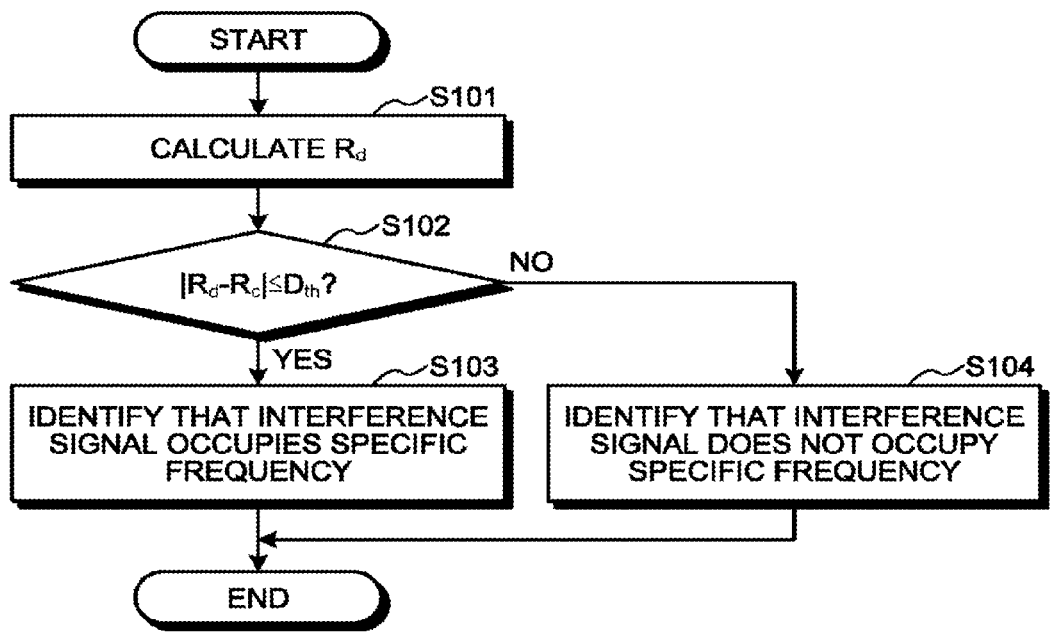
FIG. 10 is a flowchart showing an example of an identification processing procedure of an interference signal based on an autocorrelation value in an identifying unit in the first embodiment.

FIG. 10 is a flowchart showing an example of an identification processing procedure for an interference signal based on an autocorrelation value in the identifying unit 17 in this embodiment. As shown in FIG. 10, first, the identifying unit 17 calculates, using an autocorrelation value, which is accumulation of correlation values, calculated by the autocorrelation-value calculating unit 14, the result $R_d$ obtained by dividing the autocorrelation value by a total number of the correlation values, that is, the number of the correlation values added up in the accumulation (step S101). Subsequently, the identifying unit 17 determines whether the absolute value of a difference between $R_d$ and $R_c$ is equal to or smaller than a threshold $D_{th}$ (step S102). When the absolute value of the difference between $R_d$ and $R_c$ is equal to or smaller than $D_{th}$ (Yes at step S102), the identifying unit 17 identifies that the interference signal occupies a specific frequency (step S103) and ends the processing. When the absolute value of the difference between $R_d$ and $R_c$ is larger than $D_{th}$ (No at step S102), the identifying unit 17 identifies that the interference signal does not occupy the specific frequency (step S103) and ends the processing.

Figure 11:
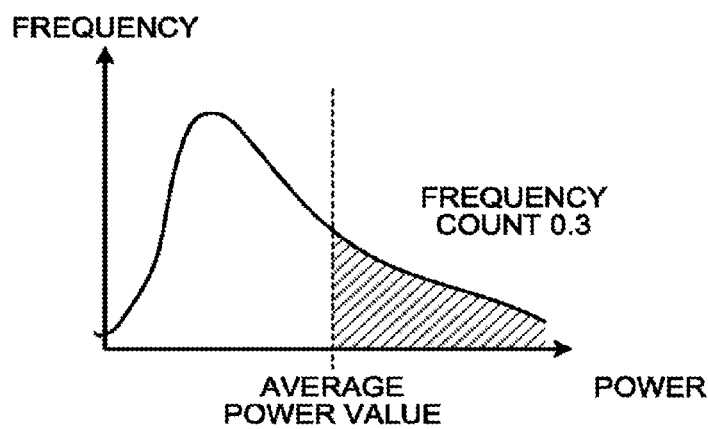
FIG. 11 is a diagram showing a frequency distribution and a frequency count of power values at the time when an interference signal occupies a specific frequency.
Figure 12:
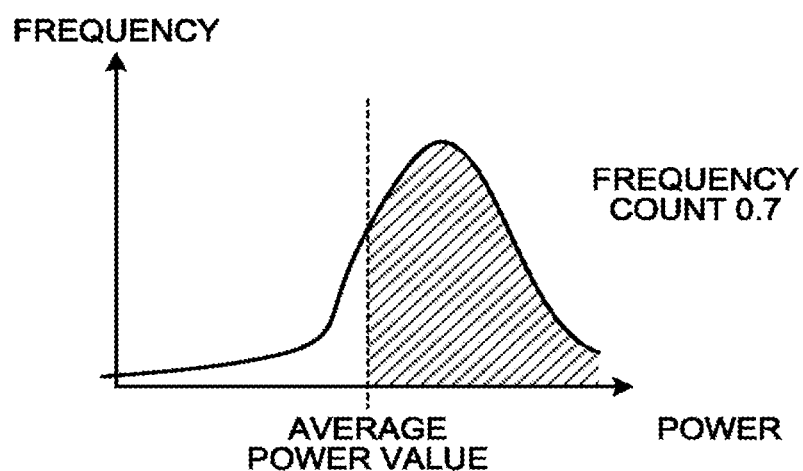
FIG. 12 is a diagram showing a frequency distribution and a frequency count of power values at the time when an interference signal is frequency-hopping.
Figure 13:
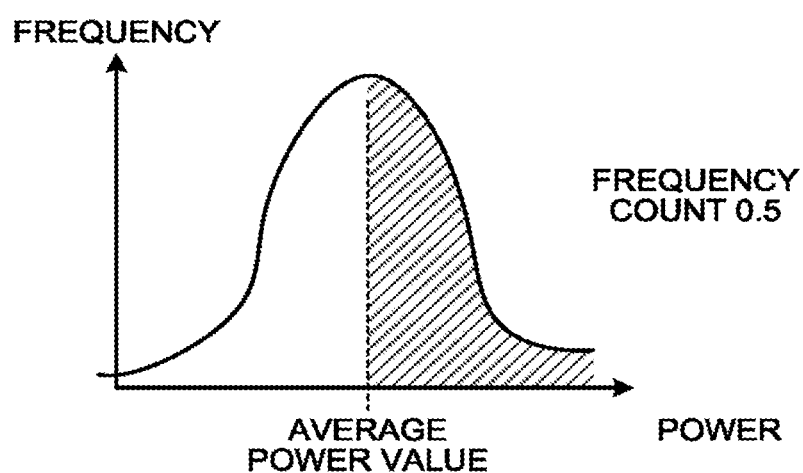
FIG. 13 is a diagram showing a frequency distribution and a frequency count of power values at the time when an interference signal is absent and when an interference signal is present at all frequencies and all times.

An identification method for an interference signal by a frequency count is explained. FIG. 11 to FIG. 13 are diagrams showing examples of frequency distributions of power values and normalized frequency counts calculated by the frequency count unit 16. FIG. 11 shows a frequency distribution and a frequency count at the time when an interference signal occupies a specific frequency. FIG. 12 shows a frequency distribution and a frequency count at the time when an interference signal is frequency-hopping. FIG. 13 shows a frequency distribution and a frequency count at the time when an interference signal is absent and when an interference signal is present at all frequencies and all times.

In the example shown in FIG. 11, the frequency count is 0.3. In the example shown in FIG. 12, the frequency count is 0.7. In the example shown in FIG. 13, the frequency count is 0.5. Therefore, the identifying unit 17 can identify characteristics of the interference signal on the basis of a value of the frequency count. For example, it can be identified that, when the frequency count is in a range of a value equal to or larger than 0 and smaller than 0.4, an interference signal occupies a specific frequency, when the frequency count is in a range of a value equal to or larger than 0.4 and smaller than 0.7, an interference signal is absent or an interference signal is present at all frequencies and at all times, and when the frequency count is equal to or larger than 0.7, an interference signal is frequency-hopping. Note that specific numerical values of the frequency counts shown in FIG. 11 to FIG. 13 are illustrations. The frequency counts are not limited to these numerical values. If an interference signal is present, an average power value is high. Therefore, by comparing the average power value with a threshold, it is possible to identify whether an interference signal is absent or an interference signal is present at all frequencies and all times. In this case, the average power value calculated by the average-power calculating unit 15 is input to the identifying unit 17 via the frequency count unit 16.

Figure 14:
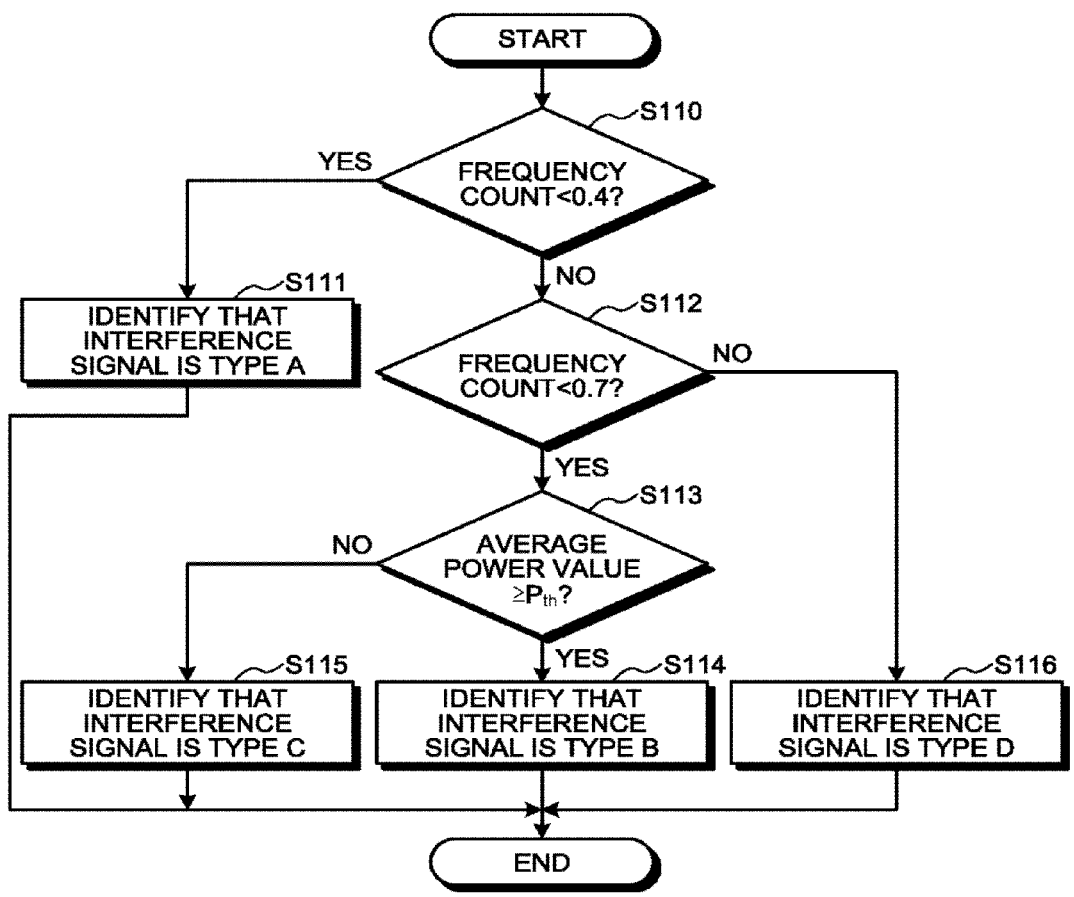
FIG. 14 is a flowchart showing an example of an identification processing procedure for an interference signal based on a frequency count in the identifying unit in the first embodiment.

FIG. 14 is a flowchart showing an example of an identification processing procedure of interference signals based on a frequency count in the identifying unit 17 in this embodiment. Note that the interference signals are divided into a plurality of types including four types of A, B, C, and D and identified. The type A indicates that an interference signal occupies a specific frequency. The type B indicates that an interference signal present at all frequencies and all times. The type C indicates that an interference signal is absent. The type D indicates that an interference signal is frequency-hopping. As shown in FIG. 14, first, the identifying unit 17 determines whether a frequency count calculated by the frequency count unit 16 is smaller than 0.4 (step S110). When the frequency count calculated by the frequency count unit 16 is smaller than 0.4 (Yes at step S110), the identifying unit 17 identifies that an interference signal is the type A (step S111) and ends the processing. When the frequency count calculated by the frequency count unit 16 is equal to or larger than 0.4 (No at step S110), the identifying unit 17 determines whether the frequency count calculated by the frequency count unit 16 is smaller than 0.7 (step S112). When the frequency count calculated by the frequency count unit 16 is smaller than 0.7 (Yes at step 3112), the identifying unit 17 determines whether an average power value calculated by the average-power calculating unit 15 is equal to or larger than the threshold $P_{th}$ (step S113). When the average power value calculated by the average-power calculating unit 15 is equal to or larger than the threshold $P_{th}$ (Yes at step S113), the identifying unit 17 identifies that the interference signal is the type B (step S114) and ends the processing. When the average power value calculated by the average-power calculating unit 15 is smaller than the threshold $P_{th}$ (No at step S113), the identifying unit 17 identifies that the interference signal is the type C (step S115) and ends the processing. When the frequency count calculated by the frequency count unit 16 is equal to or lager than 0.7 (No at step S112), the identifying unit 17 identifies that the interference signal is the type D (step S116) and ends the processing.

When characteristics of an interference signal are identified using a correlation value, a frequency count, and an average power value, the characteristics of the interference signal can be identified using the correlation value, the frequency count, or the average power value alone or can be identified by combining the correlation value, the frequency count, and the average power value. For example, when the frequency count is in a range of a value equal to or larger than 0 and smaller than 0.4 and accumulation of correlation values is equal to or larger than a fixed value, it can be determined that, for example, the interference signal occupies a specific frequency. In the above example, the interference signal is identified using the accumulation result of the autocorrelation values. However, for example, an average of the autocorrelation values can be used rather than the accumulation result. A method of identifying an interference signal on the basis of the autocorrelation value is not limited to the above example.

When a wireless communication apparatus adapted to a plurality of wireless communication systems uses a result of identification by the interference identifying device 1 in this embodiment, the wireless communication apparatus can select an appropriate wireless communication system corresponding to characteristics of an interference signal, that is, a radio wave environment. The interference identifying device 1 can be provided separately from the wireless communication apparatus. The interference identifying device 1 can notify a result obtained by classifying a radio wave environment to the wireless communication apparatus with wireless or wired communication or other means. The wireless communication apparatus can include the interference identifying device 1. The interference identifying device 1 can acquire radio wave environment measurement data from an external communication apparatus using an external wireless communication apparatus as the acquiring unit 11 without including the acquiring unit 11.

Figure 15:
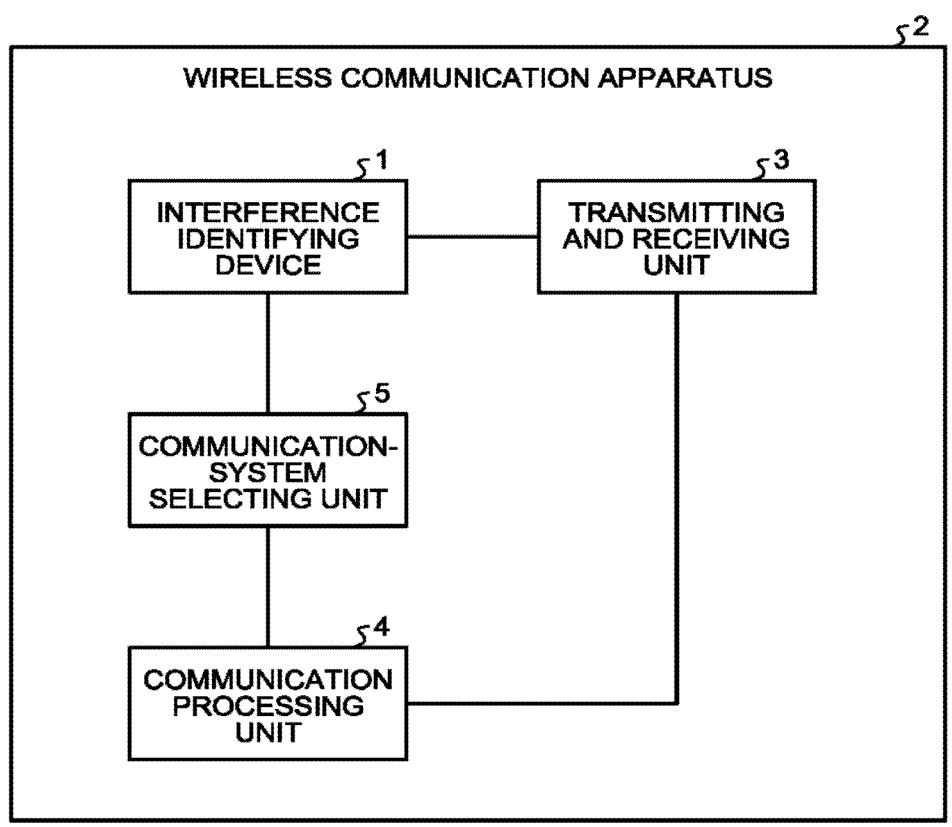
FIG. 15 is a diagram showing an example of a wireless communication apparatus mounted with the interference identifying device in the first embodiment.

As explained above, the interference identifying device in this embodiment can be mounted on the wireless communication apparatus. FIG. 15 is a diagram showing an example of a wireless communication apparatus 2 mounted with the interference identifying device 1 in this embodiment. The wireless communication apparatus 2 includes the interference identifying device 1 in this embodiment, a transmitting and receiving unit 3 that includes a transmission and reception antenna, receives an electromagnetic wave with the transmission and reception antenna, and transmits an electromagnetic wave from the transmission and reception antenna, a communication processing unit 4 capable of carrying out communication processing corresponding to a plurality of communication systems, and a communication-system selecting unit 5 that selects a communication system of the communication processing carried out by the communication processing unit 4. Note that, when the interference identifying device 1 is mounted on the wireless communication apparatus 2, the interference identifying device 1 can use the transmitting and receiving unit 3 as the acquiring unit 11 without including the acquiring unit 11.

The communication-system selecting unit 5 selects, on the basis of an identification result of an interference signal output from the interference identifying device 1, one of the plurality of communication systems adaptable by the communication processing unit 4 and instructs the communication processing unit 4 about the selected communication system. The communication processing unit 4 carries out communication processing of the communication system instructed by the communication-system selecting unit 5. Specifically, the communication processing unit 4 generates a transmission signal according to the communication system instructed by the communication-system selecting unit 5 and outputs the transmission signal to the transmitting and receiving unit 3. The transmitting and receiving unit 3 transmits, as an electromagnetic wave, the transmission signal output from the communication processing unit 4. The transmitting and receiving unit 3 outputs a reception signal to the communication processing unit 4. The communication processing unit 4 carries out, on the reception signal output from the transmitting and receiving unit 3, the communication processing of the communication system instructed by the communication-system selecting unit 5.

Figure 16:
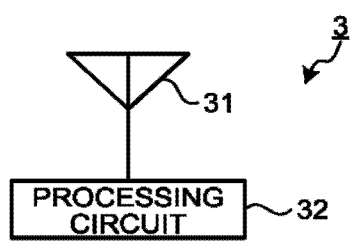
FIG. 16 is a diagram showing a configuration example of a transmitting and receiving unit in the wireless communication apparatus in the first embodiment.

For example, as shown in FIG. 16, the transmitting and receiving unit 3 is configured by a transmission and reception antenna 31 and a processing circuit 32. FIG. 16 is a diagram showing a configuration example of the transmitting and receiving unit 3 in the wireless communication apparatus 2 in this embodiment. The processing circuit 32 is an electronic circuit that outputs electric power of a received electromagnetic wave as a digital signal sampled at every fixed time. The processing circuit 32 includes an amplifier and an analog digital converter.

The communication processing unit 4 is an electronic circuit that performs transmission and reception processing corresponding to a plurality of wireless communication systems. The communication-system selecting unit 5 can be dedicated hardware or can be realized by the control circuit 200 shown in FIG. 3. The communication-system selecting unit 5 stores, in advance, correspondence between results obtained by identifying, that is, classifying interference signals and the wireless communication systems in the communication processing unit 4. The communication processing unit 4 selects a wireless communication system according to this correspondence and according to an identification result by the interference identifying device 1 and notifies the communication processing unit 4 of a selection result. For example, the communication-system selecting unit 5 stores this correspondence as a table and selects, according to the table, a wireless communication system corresponding to an identification result by the interference identifying device 1. In this case, the communication-system selecting unit 5 can be configured by a circuit that stores the table and a circuit that selects a communication system on the basis of the identification result received from the interference identifying device 1 and the table and notifies the communication processing unit 4 of a selection result.

The table is, for example, a table in which a wireless communication system corresponding to each identification result of an interference signal is stored. The communication processing unit 4 performs transmission and reception processing according to the wireless communication system notified by the communication-system selecting unit 5.

For example, it is assumed that the communication processing unit 4 is capable of carrying out transmission and reception processing of a first wireless communication system for performing 16QAM modulation (Quadrature Amplitude Modulation) and demodulation corresponding to the 16QAM modulation and a second wireless communication system that performs QPSK (Quadrature Phase Shift Keying) modulation and demodulation corresponding to the QPSK modulation. The 16QAM modulation is modulation for respectively changing, in four stages, amplitudes of two carrier waves, which are in a relation of quadrature phase, to thereby associate sixteen values with sixteen states of 4×4. The QPSK modulation is modulation for associating four values with four kinds of phases of the carrier wave. It is assumed that information indicating an environment in which an interference wave is absent or an environment in which an interference wave is present is obtained as an identification result by the interference identifying device 1. The communication-system selecting unit 5 stores, in the table, information indicating that the first wireless communication system is associated with the environment in which an interference wave is absent and the second wireless communication system is associated with the environment in which an interference wave is present. In communication in which the 16QAM modulation is used, transmission speed is higher than communication by the QPSK modulation. However, an error due to an interference wave more easily occurs than in the communication by the QPSK modulation in the environment in which an interference wave is present. In this embodiment, the communication-system selecting unit 5 can select the second wireless communication system corresponding to the 16QAM modulation in the environment in which an interference wave is absent and select the first wireless communication system corresponding to the QPSK modulation in the environment in which an interference wave is present using the identification result by the interference identifying device and the table. Consequently, it is possible to increase transmission speed in an environment in which an interference wave is small. On the other hand, in the environment in which an interference wave is present, it is possible to improve reliability of a signal using the QPSK modulation in which an error less easily occurs, although transmission speed decreases. It is possible to reduce, for example, the number of times of retransmission of data and improve a throughput of the entire system.

Note that, in this embodiment, the complex amplitude at each time and frequency of the reception signal is calculated by performing the STFT on the time waveform data, which is the reception signal. However, a method of calculating the complex amplitude at each time and frequency of the reception signal is not limited to the STFT. For example, as another spectrum analysis method, the complex amplitude at each time and frequency can be calculated by wavelet conversion.

As explained above, the interference identifying device 1 in this embodiment calculates the power values at each time and frequency of the reception signal, calculates the autocorrelation value of the calculated power value, and identifies the characteristics of the interference signal on the basis of the autocorrelation value. Alternatively, the interference identifying device 1 identifies the characteristics of the interference signal on the basis of the frequency count, which is a value obtained by counting the number of power values at each time and frequency of the reception signal exceeding the threshold. Therefore, it is possible to identify characteristics in a time domain and a frequency domain of the interference signal. It is possible to identify characteristics of the interference signal more in detail than in the past. By identifying the characteristics of the interference signal more in detail, when the wireless communication apparatus 2 selects a communication system using an identification result, the wireless communication apparatus 2 can select an appropriate communication system in which a frequency can be effectively used. Note that, as explained above, the characteristics in the time domain and the frequency domain of the interference signal can be identified using both of the autocorrelation value and the frequency count.

Second Embodiment

Figure 17:
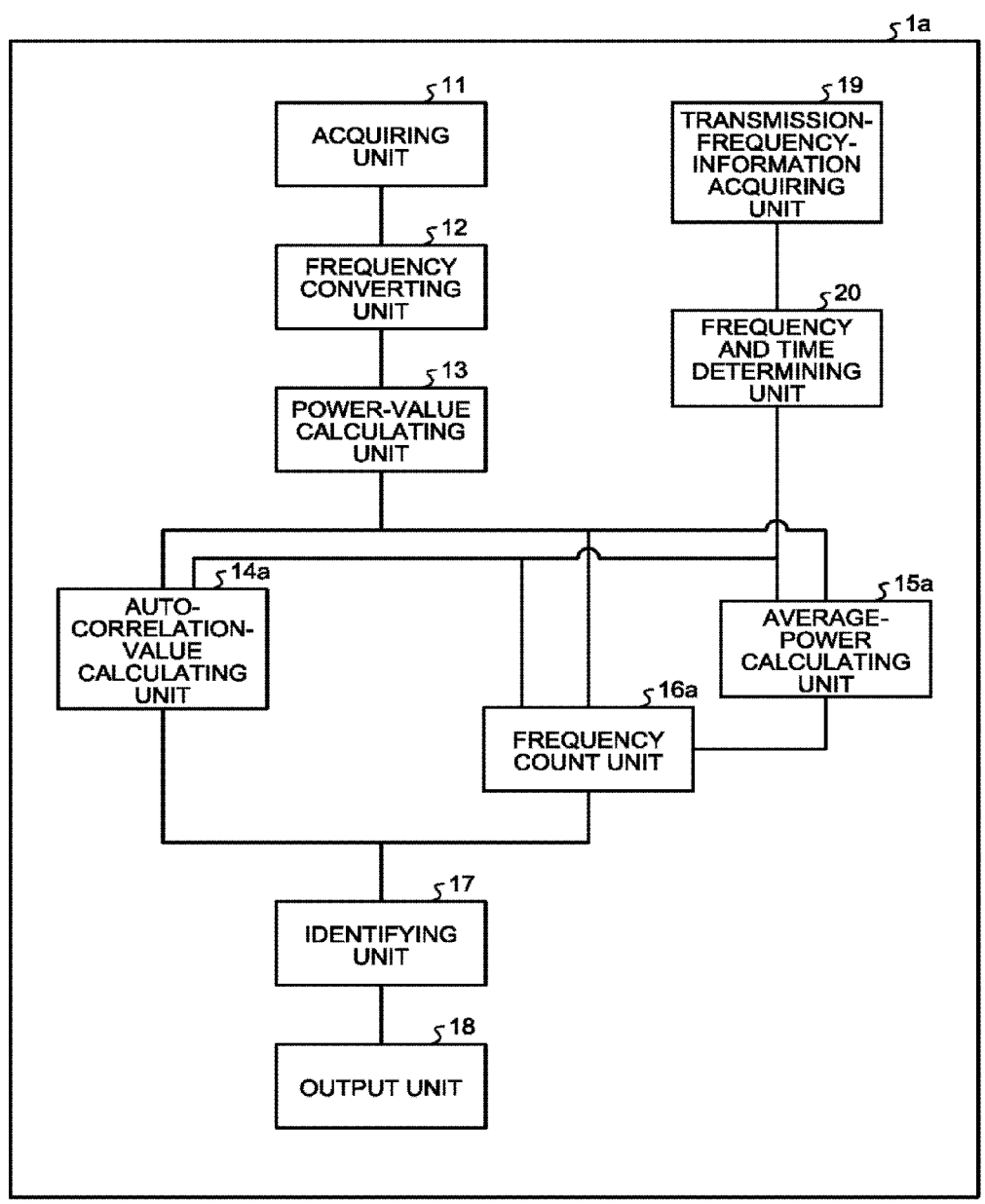
FIG. 17 is a diagram showing a configuration example of an interference identifying device according to a second embodiment.

FIG. 17 is a diagram showing a configuration example of an interference identifying device 1a according to a second embodiment of the present invention. The interference identifying device 1a in this embodiment is based on the premise that the interference identifying device 1a is mounted on a wireless communication apparatus. As shown in FIG. 17, the interference identifying device 1a in this embodiment includes the acquiring unit 11, the frequency converting unit 12, the power-value calculating unit 13, the identifying unit 17, and the output unit 18 same as those in the first embodiment. The interference identifying device 1a in this embodiment further includes a transmission-frequency-information acquiring unit 19 that acquires communication information, which is a frequency in use of the wireless communication apparatus on which the device is mounted and information concerning a transmission time such as a transmission interval, a frequency and time determining unit 20 that calculates, on the basis of the communication information of the wireless communication apparatus, a reception frequency and reception timing, that is, a reception time period of a desired wave, an autocorrelation-value calculating unit 14a that calculates an autocorrelation value using matrix data excluding components of the desired wave, an average-power calculating unit 15a that calculates an average power value using the matrix data excluding the components of the desired wave, and a frequency count unit 16a that counts power values at frequencies and times, excluding the components of the desired wave, exceeding an average power value. Components having functions same as the functions in the first embodiment are denoted by reference numerals and signs same as those in the first embodiment and redundant explanation of the components is omitted. Differences from the first embodiment are explained below.

Figure 18:
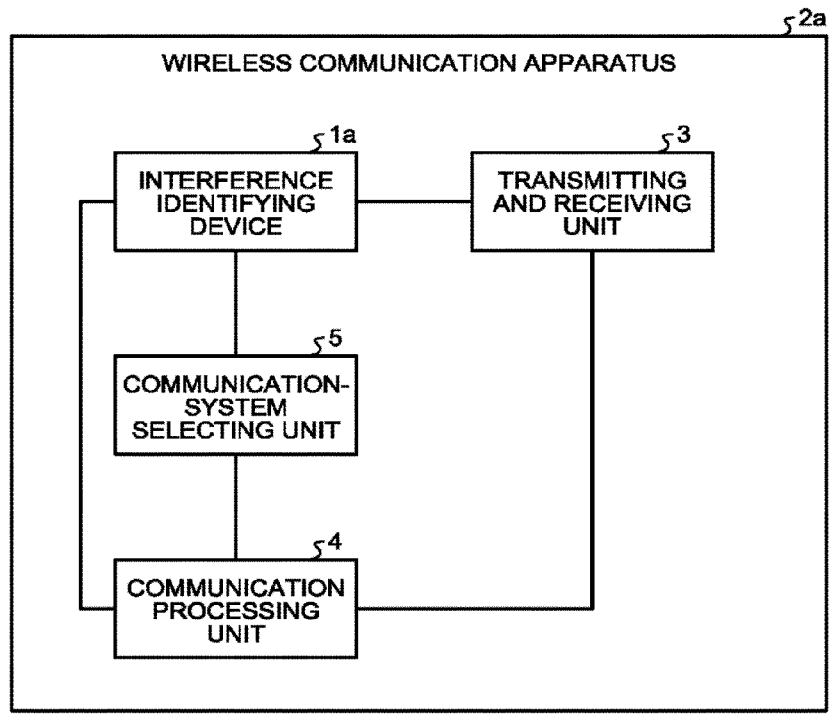
FIG. 18 is a diagram showing an example of a wireless communication apparatus mounted with the interference identifying device in the second embodiment.

FIG. 18 is a diagram showing a configuration example of a wireless communication apparatus 2a mounted with the interference identifying device 1a in this embodiment. The wireless communication apparatus 2a includes the interference identifying device 1a and the transmitting and receiving unit 3, the communication processing unit 4, and the communication-system selecting unit 5 same as those of the wireless communication apparatus 2 shown in FIG. 15 in the first embodiment. In the wireless communication apparatus 2a, the interference identifying device 1a acquires communication information such as a frequency in use and a transmission interval of the wireless communication apparatus 2a from the communication processing unit 4.

Operation is explained. The transmission-frequency-information acquiring unit 19 acquires communication information such as a transmission frequency in use and a transmission interval of the wireless communication apparatus 2a from the communication processing unit 4 and inputs the communication information to the frequency and time determining unit 20. The frequency and time determining unit 20 calculates a reception frequency and reception timing of a desired wave on the basis of the communication information input from the transmission-frequency-information acquiring unit 19 and inputs the reception frequency and the reception timing of the desired wave to the autocorrelation-value calculating unit 14a, the average power calculating unit 15a, and the frequency count unit 16a. For example, it is assumed that the wireless communication apparatus 2a uses the same frequency in transmission and reception with a communication partner and uses the same transmission interval in transmission from the wireless communication apparatus 2a to the communication partner and reception from the communication partner. In this case, the transmission frequency acquired from the communication processing unit 4 is a reception frequency of the desired wave. If reception time serving as a reference, that is, time when the desired wave was actually received in the past is further acquired from the communication processing unit 4, it is possible to calculate reception timing, that is, a reception time period on the basis of the reception time serving as the reference and the transmission interval. When the wireless communication apparatus 2a uses different frequencies in transmission from the wireless communication apparatus 2a to a communication partner apparatus and reception from the communication partner, the wireless communication apparatus 2a only has to acquire, from the communication processing unit 4, a transmission frequency in the communication partner apparatus notified from the communication partner apparatus and use the transmission frequency as a reception frequency. Note that the communication processing unit 4 extracts and stores, for reception from the communication partner apparatus, communication information such as a transmission frequency and a transmission interval notified from the communication partner apparatus. Therefore, the transmission-frequency-information acquiring unit 19 only has to acquire, from the communication processing unit 4, the communication information extracted by the communication processing unit 4. Concerning the reception timing, similarly, the transmission-frequency-information acquiring unit 19 can acquire, from the communication processing unit 4, a transmission interval in the communication partner apparatus notified from the communication partner and calculate the reception timing on the basis of the time when the desired wave was actually received in the past and the transmission interval in the communication partner apparatus.

The transmission-frequency-information acquiring unit 19 and the frequency and time determining unit 20 can be dedicated hardware or can be realized by the control circuit 200 shown in FIG. 3.

Figure 19:
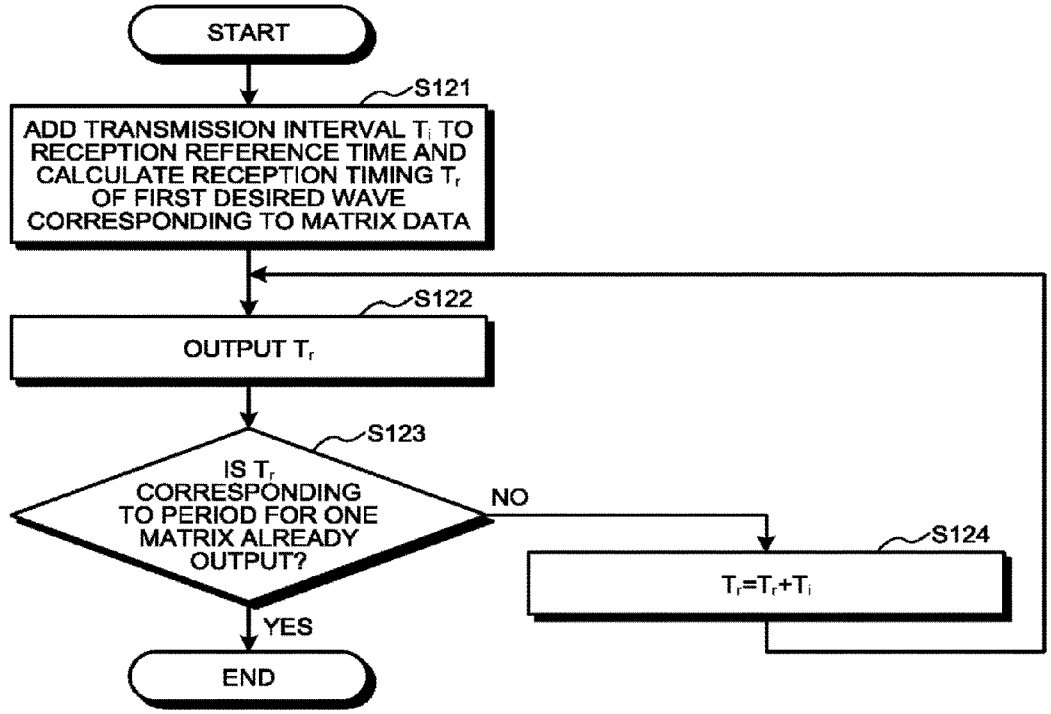
FIG. 19 is a flowchart showing an example of a calculation processing procedure for reception timing in a frequency and time determining unit in the second embodiment.

FIG. 19 is a flowchart showing an example of a calculation processing procedure for reception timing in the frequency and time determining unit 20. The frequency and time determining unit 20 adds a transmission interval $T_i$ to reception reference time to calculate reception timing $T_r$ (step S121). The reception timing $T_r$ calculated at step S121 is first reception timing corresponding to matrix data. The reception reference time is, for example, time when the desired wave was actually received in the past. When a value obtained by adding the transmission interval $T_i$ to the reception reference time is before time corresponding to the matrix data, the frequency and time determining unit 20 adds an integral multiple of the transmission interval $T_i$ to the reception timing to calculate the first reception timing corresponding to the matrix data. Subsequently, the frequency and time determining unit 20 outputs the reception timing $T_r$ to the autocorrelation-value calculating unit 14a (step S122). Subsequently, the frequency and time determining unit 20 determines whether all reception timings $T_r$ corresponding to a period of one matrix data are already output (step S123). When all the reception timings $T_r$ corresponding to the period of the one matrix data are already output (Yes at step S123), the frequency and time determining unit 20 ends the processing. For example, when a difference between the last time of the period of the one matrix data and the reception timing is smaller than the transmission interval $T_i$, the frequency and time determining unit 20 determines that all the reception timings $T_r$ corresponding to the period of the one matrix data are already output. When there is the reception timing $T_r$ not output yet is present among the reception timings $T_r$ corresponding to the period of the one matrix data (No at step S123), the frequency and time determining unit 20 sets $T_r=T_r+T_i$ (step S124) and returns to step S122. Note that, concerning a reception frequency, as explained above, the frequency and time determining unit 20 directly inputs, to the autocorrelation-value calculating unit 14a, as the reception frequency, a frequency input from the transmission-frequency-information acquiring unit 19, that is, a transmission frequency used by the communication processing unit 4 for transmission or a transmission frequency notified from the communication partner apparatus and acquired by the communication processing unit 4.

The autocorrelation-value calculating unit 14a calculates, on the basis of the reception frequency and the reception timing of the desired wave input from the frequency and time determining unit 20, an autocorrelation value using matrix data obtained by excluding elements corresponding to the reception frequency and the reception timing of the desired wave from the matrix data input from the power-value calculating unit 13. The average-power calculating unit 15a calculates, on the basis of the reception frequency and the reception timing of the desired wave input from the frequency and time determining unit 20, an average power value excluding the elements corresponding to the reception frequency and the reception timing of the desired wave among the matrix data input from the power-value calculating unit 13 and inputs the average power value to the frequency count unit 16a. The frequency count unit 16a counts, on the basis of the reception frequency and the reception timing of the desired wave input from the frequency and time determining unit 20, power values at frequencies and times excluding the desired wave exceeding the average power value using the matrix data obtained by excluding the elements corresponding to the reception frequency and the reception timing of the desired wave from the matrix data input from the power-value calculating unit 13.

Figure 20:
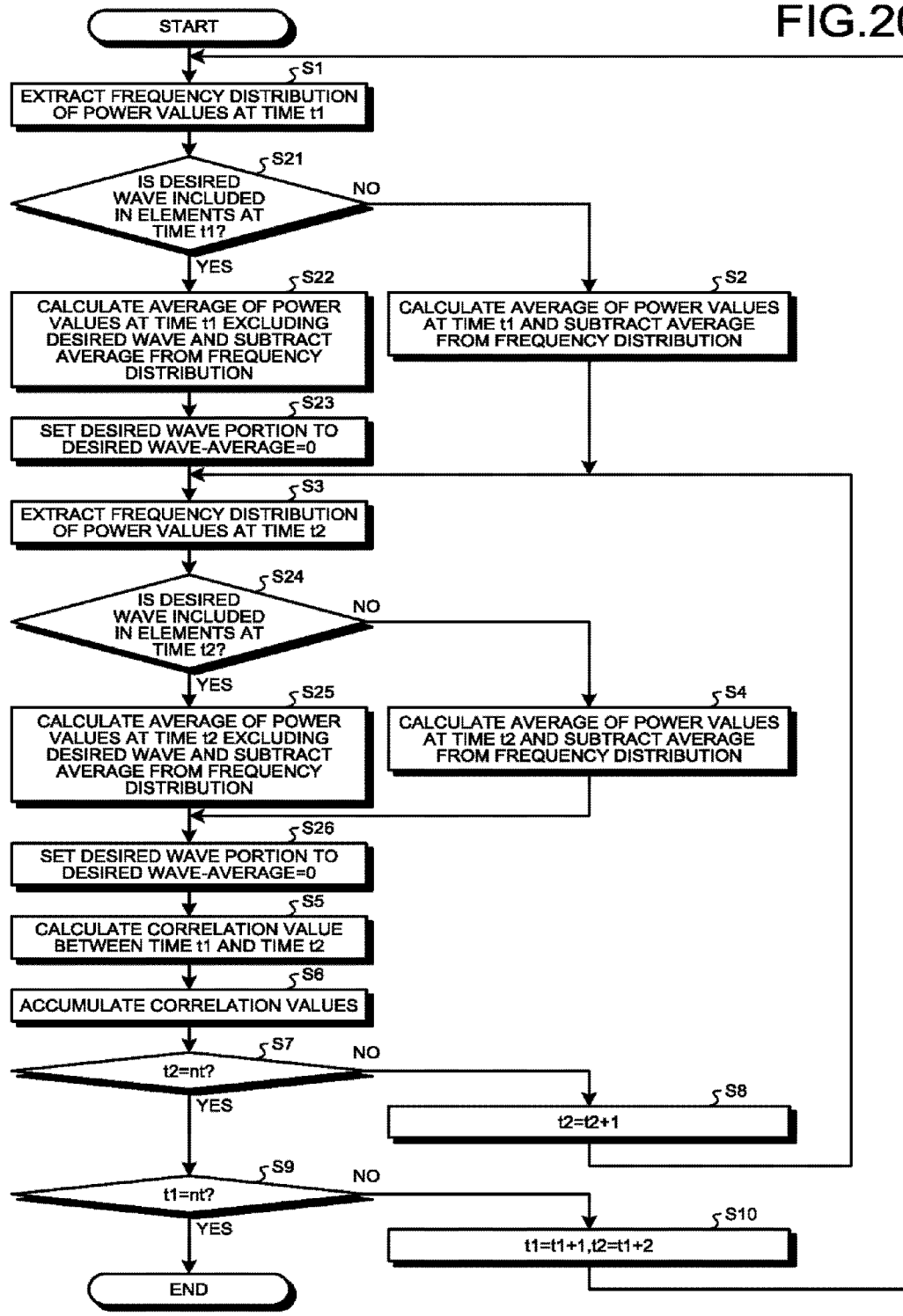
FIG. 20 is a flowchart showing an example of a calculation procedure for an autocorrelation value in an autocorrelation-value calculating unit in the second embodiment.

FIG. 20 is a flowchart showing an example of a calculation procedure for an autocorrelation value in the autocorrelation-value calculating unit 14a in this embodiment. Step S1 is the same as step S1 in the first embodiment. After step S1, the autocorrelation-value calculating unit 14a determines whether elements of a frequency and time corresponding to the desired wave are included in elements at the time t1 of the matrix data, that is, the frequency distribution of power values at the time t1 (step S21). When the elements of the frequency and time corresponding to the desired wave are included in the elements at the time t1 of the matrix data (Yes at step S21), the autocorrelation-value calculating unit 14a calculates an average of the power values at the time t1 excluding the elements of the frequency and the time corresponding to the desired wave and subtracts the average from the frequency distribution of the power values at the time t1 (step S22). Specifically, when the number of elements excluding the elements of the frequency and the time corresponding to the desired wave in the vector vt1 explained in the first embodiment is represented as fc, the autocorrelation-value calculating unit 14a calculates an average mPt1 of fc elements, that is, power values excluding the elements of the frequency and time corresponding to the desired wave. The autocorrelation-value calculating unit 14a calculates the vector v=($P_{t1, 1}$-m$P_{t1}$, . . . , $P_{t1, nf}$-m$P_{t1}$).

Subsequently, the autocorrelation-value calculating unit 14a sets a desired wave portion, that is, the elements of the frequency and the time corresponding to the desired wave to the desired wave–the average=0 (step S23). Specifically, when the elements of the matrix data corresponding to the frequency and the time corresponding to the desired wave are represented as $P_{t1, k}$, the autocorrelation-value calculating unit 14a sets an element of $P_{t1, k}$-m$P_{t1}$ among the elements of the vector v to 0.

Subsequently, as in the first embodiment, the autocorrelation-value calculating unit 14a carries out step S3. The autocorrelation-value calculating unit 14a determines whether the elements of the frequency and the time corresponding to the desired wave are included in the elements at the time t2 of the matrix data, that is, the frequency distribution of electric power at the time t2 (step S24). When the elements of the frequency and the time corresponding to the desired wave are included in the elements at the time t2 of the matrix data (Yes at step S24), the autocorrelation-value calculating unit 14a calculates an average of the power values at the time t2 excluding the elements of the frequency and the time corresponding to the desired wave and subtracts the average from the frequency distribution of the electric power at the time t2 (step S25). Specifically, when the number of elements excluding elements of a frequency and time corresponding to the desired wave in the vector $v_{t2}$ explained in the first embodiment is represented as fd, the autocorrelation-value calculating unit 14a calculates an average m$P_{t2}$ of fd elements, that is, power values excluding the elements of the frequency and the time corresponding to the desired wave. The autocorrelation-value calculating unit 14a calculates the vector w=($P_{t2, 1}$-m$P_{t2}$, $P_{t2, 1}$-m$P_{t2}$, . . . , $P_{t2, nf}$-m$P_{t2}$).

Subsequently, the autocorrelation-value calculating unit 14a sets a desired wave portion, that is, the elements of the frequency and the time corresponding to the desired wave to the desired wave–the average=0 (step S26). Specifically, when the elements of the matrix data corresponding to the frequency and the time corresponding to the desired wave are represented as $P_{t2, k}$, the autocorrelation-value calculating unit 14a sets an element of $P_{t2, k}$-m$P_{t2}$ among the elements of the vector w to 0.

Thereafter, as in the first embodiment, the autocorrelation-value calculating unit 14a carries out steps S5 to S10. When the elements of the frequency and the time corresponding to the desired wave are not included in the elements at the time t1 of the matrix data at step S21 (No at step S21), the autocorrelation-value calculating unit 14a carries out step S2 same as step S2 in the first embodiment and proceeds to step S24. When the elements of the frequency and the time corresponding to the desired wave are not included in the elements at the time t2 of the matrix data at step S24 (No at step S24), the autocorrelation-value calculating unit 14a carries out step S4 same as step S4 in the first embodiment and proceeds to step S26.

Figure 21:
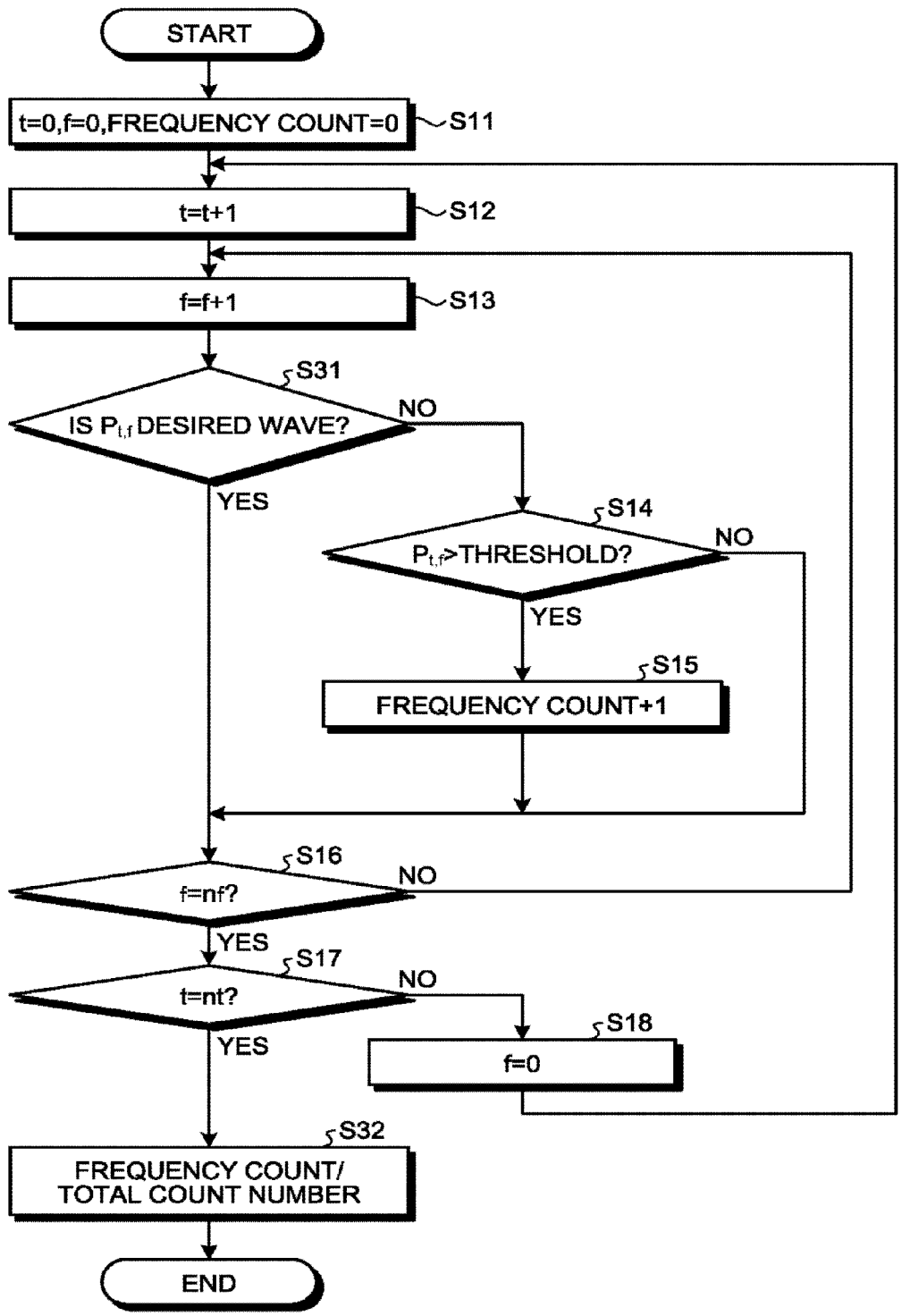
FIG. 21 is a flowchart showing an example of a counting processing procedure for power values in a frequency count unit in the second embodiment.

FIG. 21 is a flowchart showing an example of a counting processing procedure for power values in the frequency count unit 16a in this embodiment. First, as in the first embodiment, the frequency count unit 16a carries out step S11 to step S13. After step S13, the frequency count unit 16a determines whether the power value $P_{t,f}$ of the matrix data is a desired wave, that is, whether t and f are a reception frequency and reception timing corresponding to the desired wave (step S31). When determining that the power value $P_{t,f}$ of the matrix data is the desired wave (Yes at step S31), the frequency count unit 16a proceeds to step S16 same as step S16 in the first embodiment. Step S14 to step S18 are the same as step S14 to step S18 in the first embodiment. However, when determining at step S17 that t is equal to nt (Yes at step S17), the frequency count unit 16a proceeds to step S32 explained below. When determining in step S31 that the power value $P_{t,f}$ of the matrix data is not the desired wave (No at step S31), the frequency count unit 16a proceeds to step S14.

At step S32, the frequency count unit 16a performs normalization by dividing the frequency count by a total count number. The total count number at this point is a number obtained by excluding the number of elements corresponding to the desired wave from the number of elements of the matrix data.

Operation other than the operation in this embodiment explained above is the same as the operation in the first embodiment. However, in this embodiment, the identifying unit 17 performs identification of an interference signal on the basis of the correlation value calculated by excluding the components of the desired wave, the frequency count calculated by excluding the components of the desired wave, and the average power value calculated by excluding the components of the desired wave.

As explained above, the interference identifying device 1a in this embodiment calculates the power values at each time and frequency of the reception signal, calculates the autocorrelation value excluding the portion corresponding to the desired wave among the calculated power values, and identifies the characteristics of the interference signal on the basis of the autocorrelation value. Alternatively, the interference identifying device 1a identifies the characteristics of the interference signal on the basis of the frequency count, which is a value obtained by counting the number of power values, excluding the portion corresponding to the desired wave among power values at each time and frequency of the reception signal, exceeding the threshold. Therefore, it is possible to identify characteristics in a time domain and a frequency domain of the interference signal. Further, by performing calculation for identifying the interference signal excluding the desired wave, it is possible to more accurately identify the interference signal in a radio wave environment. Note that, as explained in the first embodiment, the characteristics in the time domain and the frequency domain of the interference signal can be identified using both of the autocorrelation value and the frequency count.

Third Embodiment

Figure 22:
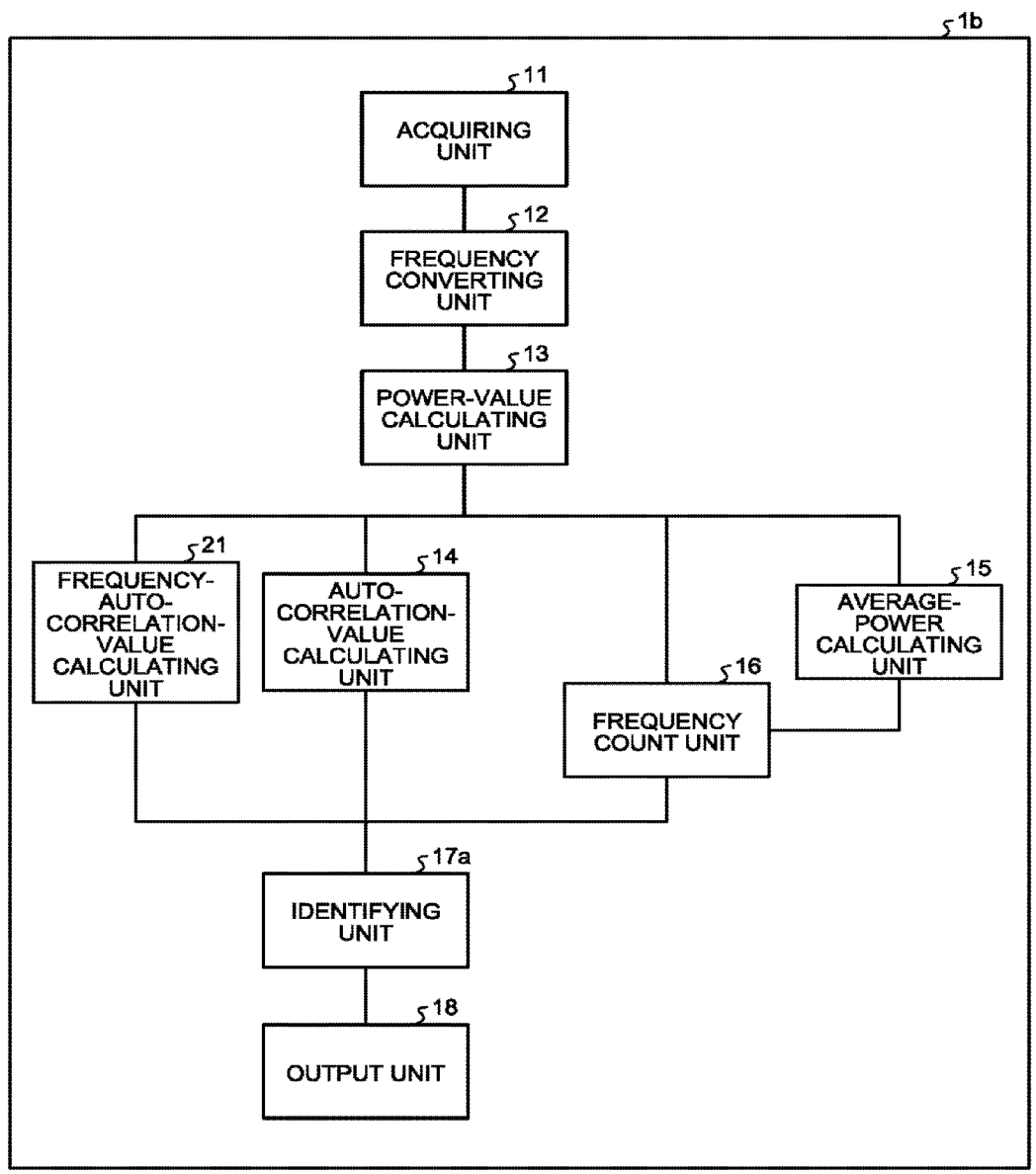
FIG. 22 is a diagram showing a configuration example of an interference identifying device according to a third embodiment.

FIG. 22 is a diagram showing a configuration example of an interference identifying device 1b according to a third embodiment of the present invention. As shown in FIG. 22, the interference identifying device 1b in this embodiment is the same as the interference identifying device 1 in the first embodiment except that a frequency-autocorrelation-value calculating unit 21 that calculates a frequency autocorrelation value is added to the interference identifying device 1 in the first embodiment and an identifying unit 17a is included instead of the identifying unit 17. Components having functions same as the functions in the first embodiment are denoted by reference numerals and signs same as those in the first embodiment and redundant explanation of the components is omitted. Differences from the first embodiment are explained below.

The frequency-autocorrelation-value calculating unit 21 and the identifying unit 17a can be dedicated hardware or can be realized by the control circuit 200 shown in FIG. 3.

In the first and second embodiments, it is explained that the autocorrelation-value calculating unit 14 calculates the autocorrelation value between the frequency distributions, that is, the spectra at the different times, that is, the autocorrelation value in the time direction. In this embodiment, more detailed identification of an interference signal is enabled by calculating not only the autocorrelation value in the time direction but also a frequency autocorrelation value, which is an autocorrelation value in a frequency direction. This embodiment is effective, in particular, for identifying bandwidth of an interference signal at the time when the interference signal occupies a specific frequency.

Operation is explained. The frequency-autocorrelation-value calculating unit 21 calculates a frequency autocorrelation value using matrix data input from the power-value calculating unit 13 and inputs the frequency correlation value to the identifying unit 17a. The identifying unit 17a identifies characteristics of an interference signal using the autocorrelation value input from the autocorrelation-value calculating unit 14, the frequency autocorrelation value input from the frequency-autocorrelation-value calculating unit 21, the frequency count input from the frequency count unit 16, and the average power value.

Figure 23:
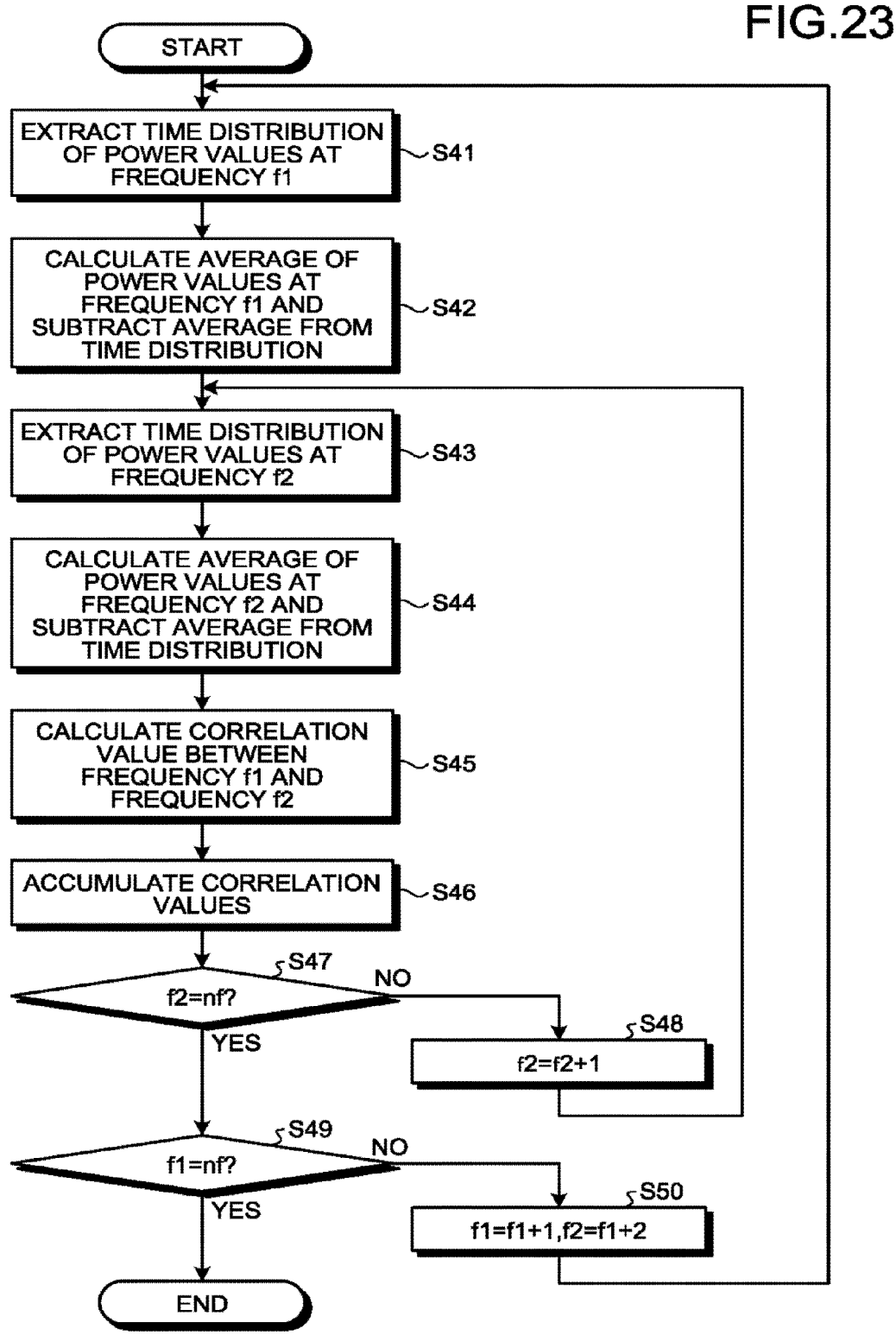
FIG. 23 is a flowchart showing an example of a calculation procedure for a frequency autocorrelation value in a frequency-autocorrelation-value calculating unit in the third embodiment.

FIG. 23 is a flowchart showing an example of a calculation procedure for a frequency autocorrelation value in the frequency-autocorrelation-value calculating unit 21 in this embodiment. As shown in FIG. 23, first, the frequency-autocorrelation-value calculating unit 21 extracts, from matrix data, a vector $v_{f1}=(P_{1,f1}, P_{2,f1}, \ldots, P_{nt,f1})$, which is a time distribution of power values at a frequency f1, which is a first frequency (step S41). Subsequently, the frequency-autocorrelation-value calculating unit 21 calculates an average $mP_{f1}$ of the power values at the frequency f1 and subtracts the average from the time distribution (step S42). Specifically, the frequency-autocorrelation-value calculating unit 21 calculates the average $mP_{f1}$ of the elements of the vector $v_{f1}$ and calculates a vector $v=(P_{1,f1}-mP_{f1}, P_{2,f1}-mP_{f1}, \ldots, P_{nt,f1}-mP_{t1})$ using the vector $v_{f2}$ and the average $mP_{f1}$.

Similarly, the frequency-autocorrelation-value calculating unit 21 extracts, from the matrix data, a vector $v_{f2}=(P_{1,f2}, P_{2,f2}, \ldots, P_{nt,f2})$, which is a time distribution of power values at a frequency f2, which is a second frequency (step S43). The frequency-autocorrelation-value calculating unit 21 calculates an average $mP_{f2}$ of the power values at the frequency f2 and subtracts the average from the time distribution (step S44). Specifically, the frequency-autocorrelation-value calculating unit 21 calculates a vector $w=(P_{1,f2}-mP_{f2}, P_{1,f2}-mP_{f2}, \ldots, P_{1,f2}-mP_{f2})$ using the vector $v_{f2}$ and the average $mP_{f2}$.

Subsequently, the frequency-autocorrelation-value calculating unit 21 calculates a correlation value between the frequency f1 and the frequency f2 (step S45). Specifically, the frequency-autocorrelation-value calculating unit 21 calculates a correlation value R, that is, a frequency correlation value according to Expression (5) explained in the first embodiment using the vectors v and w.

Subsequently, the frequency-autocorrelation-value calculating unit 21 accumulates correlation values (step S46). Specifically, the frequency-autocorrelation-value calculating unit 21 calculates an accumulation value $R_{sum}=R+R_{sum}$. Note that 0 is set as $R_{sum}$ in an initial state. For example, $R_{sum}=0$ is set before step S41.

Subsequently, the frequency-autocorrelation-value calculating unit 21 determines whether f2 is equal to nf (step S47). When determining that f2 is not equal to nf (No at step S47), the frequency-autocorrelation-value calculating unit 21 sets f2=f2+1 (step S48) and returns to step S43. When determining at step S47 that f2 is equal to nf (Yes at step S47), the frequency-autocorrelation-value calculating unit 21 determines whether f1 is equal to nf (step S49). When determining at step S49 that f1 is not equal to nf (No at step S49), the frequency-autocorrelation-value calculating unit 21 sets f1=f1+1 and sets f2=f1+2 (step S50) and returns to step S41. When determining at step S49 that f1 is equal to nf (Yes at step S49), the frequency-autocorrelation-value calculating unit 21 ends the processing.

According to the processing explained above, the frequency-autocorrelation-value calculating unit 21 calculates correlation values of combinations of all frequencies in the matrix data and calculates an accumulation value of the correlation values. The frequency-autocorrelation-value calculating unit 21 inputs the accumulation value obtained by the processing to the identifying unit 17a as a frequency autocorrelation value.

A calculation method for bandwidth of an interference signal in the identifying unit 17a in this embodiment is explained. FIG. 24 is a diagram showing an example of a frequency autocorrelation value at each bandwidth of a specific frequency occupied by an interference signal. On the upper side of FIG. 24, an interference signal occupies a frequency in a narrow band, for example, a band equal to or smaller than first bandwidth. On the lower side of FIG. 24, an interference signal occupies a frequency in a wide band. When the interference signal occupies the frequency in the narrow band, the frequency autocorrelation value is 0.3. When the interference signal occupies the frequency in the wide band, for example, the band wider than the first bandwidth, the frequency autocorrelation value is 0.7. Note that the frequency autocorrelation values in FIG. 24 are examples. Values of the autocorrelation values are not limited to the examples in FIG. 24.

When an interference signal occupies a specific frequency, a frequency autocorrelation value indicates continuity in a frequency direction of power values of the interference signal. Therefore, when the interference signal occupies the specific frequency, the frequency autocorrelation value is information indicating bandwidth occupied by the interference signal. Therefore, for example, when it is identified by the interference identifying method in the first embodiment or the second embodiment using the autocorrelation value in the time direction that the interference signal occupies the specific frequency, it is possible to calculate bandwidth occupied by the interference signal on the basis of the frequency autocorrelation value. Operation in this embodiment other than the operation explained above is the same as the operation in the first embodiment.

Figure 25:
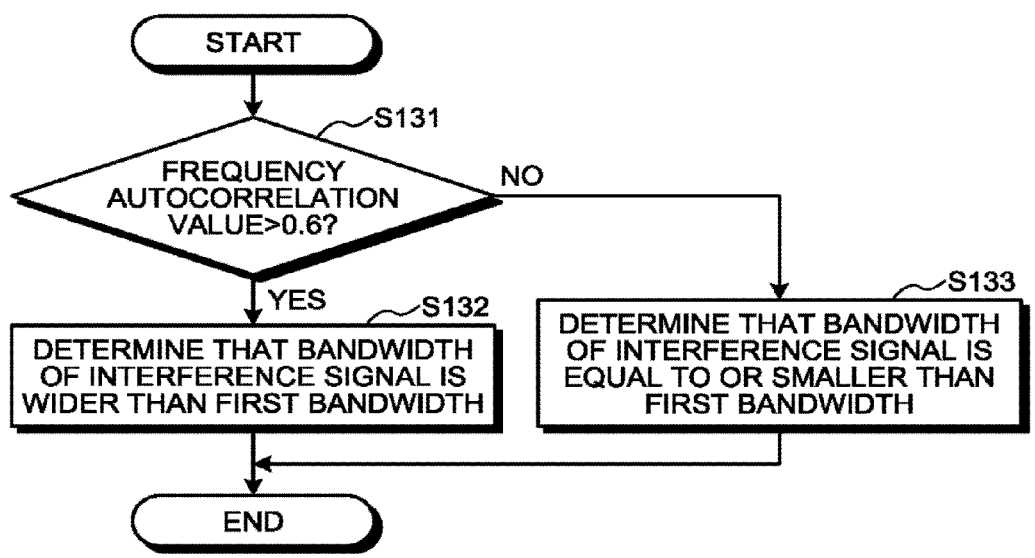
FIG. 25 is a flowchart showing an example of a calculation method for bandwidth of an interference signal in an identifying unit in the third embodiment.

FIG. 25 is a flowchart showing an example of a calculation method for bandwidth of an interference signal in the identifying unit 17a in this embodiment. The identifying unit 17a determines whether a frequency autocorrelation value is larger than 0.6 (step S131). When the frequency autocorrelation value is larger than 0.6 (Yes at step S131), the identifying unit 17a determines that the bandwidth of the interference signal is wider than the first bandwidth (step S132) and ends the processing. When the frequency autocorrelation value is equal to or smaller than 0.6 (No at step S131), the identifying unit 17a determines that the bandwidth of the interference signal is equal to or smaller than the first bandwidth (step S133) and ends the processing. Note that the threshold for the determination at step S131 shown in FIG. 25 is an example. A value of the threshold is not limited to this example. In the example shown in FIG. 25, an example is shown in which it is determined in two stages whether the bandwidth is equal to or smaller than the first bandwidth. However, it is also possible to set a plurality of thresholds corresponding to a plurality of bandwidths and classify the bandwidths into three or more stages.

Note that the frequency-autocorrelation-value calculating unit 21 is added to the frequency identifying device 1 in the first embodiment and the identifying unit 17a is included instead of the identifying unit 17. However, it is also possible to add the frequency-autocorrelation-value calculating unit 21 to the interference identifying device 1a in the second embodiment and include the identifying unit 17a instead of the identifying unit 17. When the frequency-autocorrelation-value calculating unit 21 is added to the second embodiment, similarly, it is possible to calculate the bandwidth occupied by the interference signal by further using the frequency autocorrelation value. As explained in the first embodiment and the second embodiment, it is possible to mount the interference identifying device 1b in this embodiment on a wireless communication apparatus.

As explained above, in this embodiment, by using the frequency autocorrelation value, it is possible to more accurately identify characteristics of interference in radio wave environment measurement data with the frequency autocorrelation value in addition to the autocorrelation value, the average power, and the frequency count using information concerning time and a frequency.

Fourth Embodiment

Figure 26:
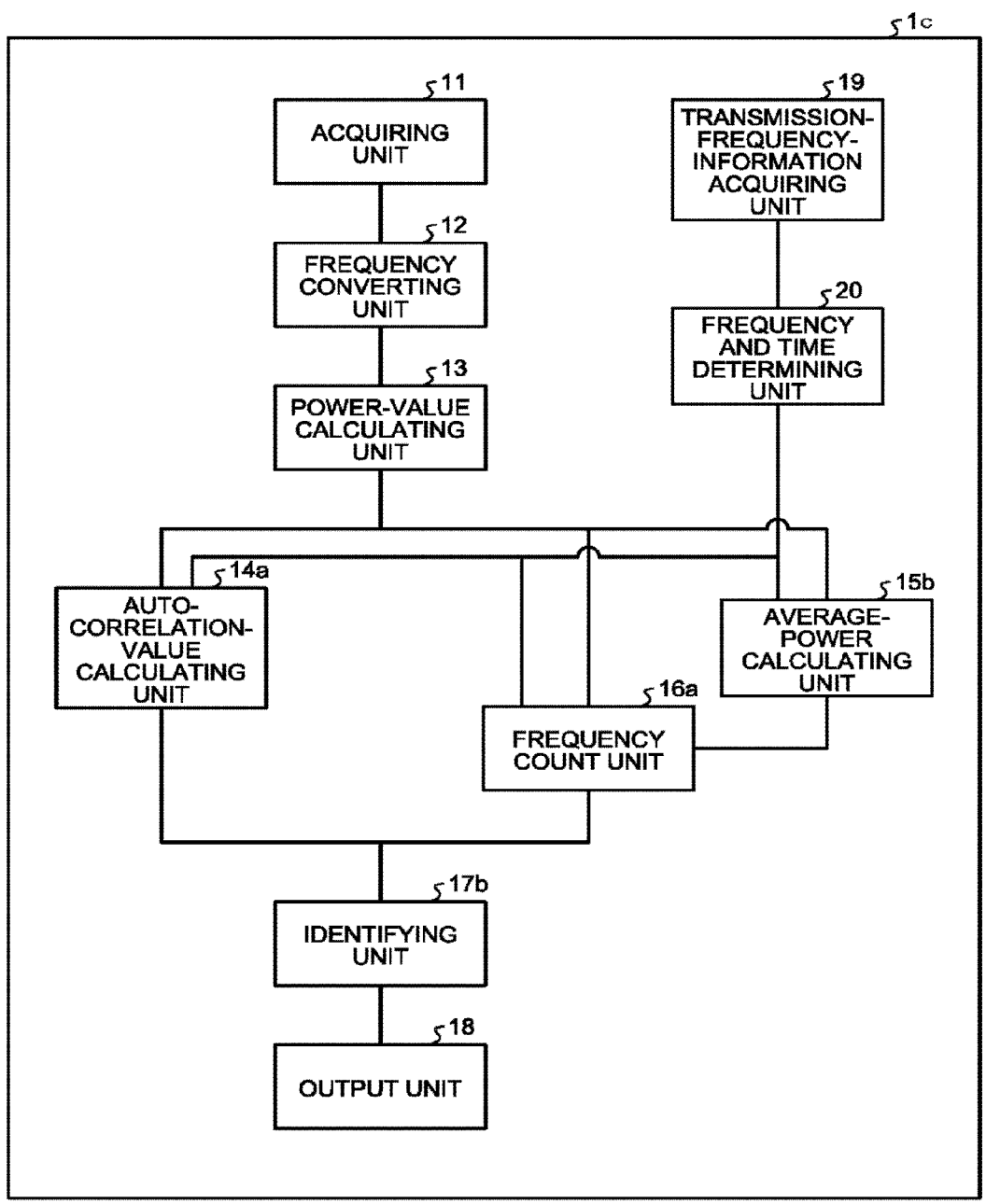
FIG. 26 is a diagram showing a configuration example of an interference identifying device according to a fourth embodiment.

FIG. 26 is a diagram showing a configuration example of an interference identifying device 1c according to a fourth embodiment of the present invention. As shown in FIG. 26, the interference identifying device 1c in this embodiment is the same as the interference identifying device 1a in the second embodiment except that the interference identifying device 1c includes an average-power calculating unit 15b and an identifying unit 17b instead of the average-power calculating unit 15a and the identifying unit 17 of the interference identifying device 1a in the second embodiment. Components having functions same as the functions in the second embodiment are denoted by reference numerals and signs same as those in the second embodiment and redundant explanation of the components is omitted. Differences from the second embodiment are explained below.

The average-power calculating unit 15b calculates an average power value of a desired wave. The identifying unit 17b identifies, on the basis of the autocorrelation value, the frequency count, and the average power value of the desired wave, an interference signal affecting the desired wave.

The average-power calculating unit 15b and the identifying unit 17b can be dedicated hardware or can be realized by the control circuit 200 shown in FIG. 3.

Operation is explained. The average-power calculating unit 15b calculates an average power value using an element corresponding to the desired wave among matrix data on the basis of a reception frequency and reception timing of the desired wave input from the frequency and time determining unit 20. Specifically, the average-power calculating unit 15b extracts elements corresponding to the reception frequency and the reception timing of the desired wave among the elements $P_{t,f}$ of the matrix data shown in Expression (4), calculates a sum of the extracted elements, and divides the calculated sum by the number of the elements corresponding to the reception frequency and the reception timing of the desired wave to calculate an average power value. Consequently, it is possible to calculate the average power value of the desired wave. As in the second embodiment, the frequency count unit 16a uses the input average power value as a threshold and counts power values exceeding the threshold. Consequently, a frequency count of power values exceeding the average power value of the desired wave is calculated.

An identification method for an interference signal in the identifying unit 17b is explained. The identifying unit 17b identifies an interference signal in the same manner as in the second embodiment. As explained above, in this embodiment, the frequency count unit 16a calculates the frequency count of the power values exceeding the average power value of the desired wave. That is, the frequency count calculated by the frequency count unit 16a indicates a frequency of interference signals exceeding the average power value of the desired wave among interference signals. When an interference signal is small compared with the desired wave, influence on the desired wave is small. In this embodiment, the interference signal is identified as in the second embodiment. The frequency count obtained by counting the power values exceeding the average power value of the desired value is used as an indicator indicating a degree of the influence on the desired wave.

FIG. 27 is a diagram showing an example of a frequency distribution obtained by counting the power values exceeding the average power value of the desired wave. In FIG. 27, the horizontal axis indicates electric power, that is, a power value and the vertical axis indicates a frequency. In an example described as a radio wave environment #1 on the upper side of FIG. 27, there are more high frequencies of power values compared with an example described as a radio wave environment #2 on the lower side of FIG. 27. The frequency count calculated by the frequency count unit 16a in this embodiment is 0.45 in an example on the left side and is 0.30 in an example on the right side. Therefore, referring to the frequency count, it is seen that there are more interference signals affecting the desired wave in the radio wave environment #1 shown on the upper side than the radio wave environment #2 shown on the lower side of FIG. 27.

Figure 28:
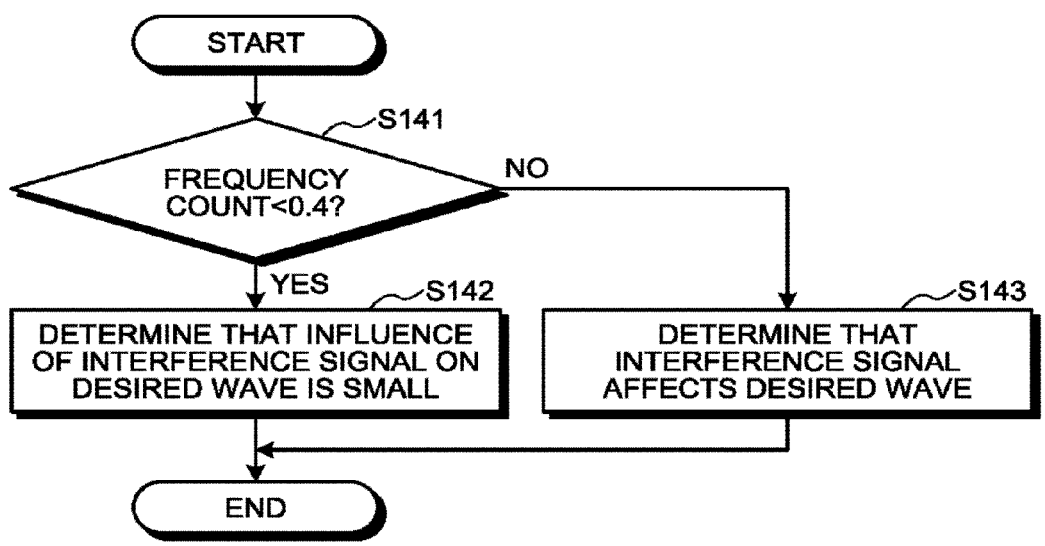
FIG. 28 is a flowchart showing an example of a determination method for a frequency of an interference signal affecting the desired wave in an identifying unit.

FIG. 28 is a flowchart showing an example of a determination method for a degree of the influence of an interference signal on the desired wave in the identifying unit 17b. The identifying unit 17b determines whether the frequency count calculated by the frequency count unit 16a is smaller than 0.4 (step S141). When the frequency count calculated by the frequency count unit 16a is smaller than 0.4 (Yes at step S141), the identifying unit 17b determines that the influence of the interference signal on the desired wave is small (step S142) and ends the processing. The influence of the interference signal on the desired wave is small is, for example, in a state in which a ratio of the interference signal to the desired wave is equal to or smaller than a predetermined value. The predetermined value is decided by a design value, a simulation, or the like. As a threshold used in the determination at step S141, a frequency count, which is calculated by measurement, a simulation, or the like, in a state in which the ratio of the interference signal to the desired wave is the predetermined value can be used.

When the frequency count calculated by the frequency count unit 16a is equal to or larger than 0.4 (No at step S141), the identifying unit 17b determines that the influence of the interference signal on the desired wave is not small (step S143) and ends the processing.

Note that it is also possible that the frequency-autocorrelation-value calculating unit 21 in the third embodiment is added to the interference identifying device 1c in this embodiment and the identifying unit 17b performs the identification of the interference signal using the frequency autocorrelation value like the identifying unit 17a in the third embodiment.

As explained above, the interference identifying device in this embodiment evaluates a ratio of interference signals exceeding the average power value of the desired wave. Therefore, it is possible to obtain effects same as the effects in the second embodiment. It is possible to identify an interference signal affecting the desired wave in a radio wave environment.

The configurations explained in the embodiments indicate examples of the contents of the present invention and can be combined with other publicly-known technologies. A part of the configurations can be omitted or changed in a range not departing from the spirit of the present invention.

REFERENCE SIGNS LIST 1, 1a, 1b, 1c interference identifying device
2, 2a wireless communication apparatus
3 transmitting and receiving unit
4 communication processing unit
5 communication-system selecting unit
11 acquiring unit
12 frequency converting unit
13 power-value calculating unit
14, 14a autocorrelation-value calculating unit
15, 15a, 15b average-power calculating unit
16, 16a frequency count unit
17, 17a, 17b identifying unit
18 output unit
19 transmission-frequency-information acquiring unit
20 frequency and time determining unit
21 frequency-autocorrelation-value calculating unit

The invention claimed is:

1. An interference identifying device comprising:
a receiver to receive a reception signal obtained by reception of an electromagnetic wave;
a frequency converter to calculate, using the reception signal, matrix data indicating complex amplitude at each time and frequency of the reception signal;
an autocorrelation-value calculator to calculate, using the matrix data, correlation values between frequency distributions at plural times and to accumulate the correlation values into an autocorrelation value; and
an identifier to identify characteristics of an interference signal based on the autocorrelation value.

2. The interference identifying device according to claim 1, further comprising:
a power-value calculator to calculate power values from the complex amplitude, which is an element of the matrix data;
an average-power calculator to calculate an average power value on the basis of the power values output from the power-value calculator; and
a frequency counter to count a frequency of the power values, which are output from the power-value calculator, exceeding the average power value, wherein
the identifier further identifies the characteristics of the interference signal on the basis of the frequency calculated by the frequency counter.

3. The interference identifying device according to claim 2, wherein the identifier identifies presence or absence of the interference signal on the basis of the average power value.

4. The interference identifying device according to claim 1, wherein
the interference identifying device is set in a wireless communication apparatus,
the interference identifying device further comprises:
a transmission-frequency-information receiver to receive communication information, which is information concerning a transmission frequency and a transmission time used by the wireless communication apparatus; and
a frequency and time calculator to calculate, on the basis of the communication information, a reception frequency and a reception time period for receiving a desired wave, wherein
the autocorrelation-value calculator calculates the correlation values using the matrix data excluding elements corresponding to the reception frequency and the reception time period.

5. The interference identifying device according to claim 4, further comprising:
a power-value calculator to calculate power values from the complex amplitude, which is an element of the matrix data;
an average-power calculator to calculate an average power value on the basis of power values excluding power values corresponding to the reception frequency and the reception time period among the power values output from the power-value calculator; and
a frequency counter to count a frequency of the power values, excluding the power values corresponding to the reception frequency and the reception time period among the power values output from the power-value calculator, exceeding the average power value, wherein
the identifier identifies the characteristics of the interference signal further on the basis of the frequency calculated by the frequency counter.

6. The interference identifying device according to claim 5, wherein the identifier identifies presence or absence of the interference signal on the basis of the average power value.

7. The interference identifying device according to claim 4, further comprising:
a power-value calculator to calculate power values from the complex amplitude, which is an element of the matrix data;
an average-power calculator to calculate an average power value on the basis of power values corresponding to the reception frequency and the reception time period among the power values output from the power-value calculator; and
a frequency counter to count a frequency of power values, excluding the power values corresponding to the reception frequency and the reception time period among the power values output from the power-value calculator, exceeding the average power value, wherein
the identifier calculates, further on the basis of the frequency counted by the frequency counter, a ratio of interference signals affecting the desired wave.

8. The interference identifying device according to claim 1, further comprising a frequency-autocorrelation-value calculator to calculate a frequency correlation value, which is a correlation value between a time distribution of a first frequency and a time distribution of a second frequency using the matrix data, wherein
the identifier identifies the characteristics of the interference signal further on the basis of the frequency correlation value calculated by the frequency-autocorrelation-value calculator.

9. The interference identifying device according to claim 1, wherein the frequency converter calculates the matrix data by performing short-time Fourier transform on the reception signal.

10. The interference identifying device according to claim 1, wherein
the autocorrelation-value calculator calculates the correlation values concerning combinations of all times corresponding to the matrix data and calculates the autocorrelation value as an accumulation result of the calculated correlation values.

11. A wireless communication apparatus comprising the interference identifying device according to claim 1.

12. An interference identifying method comprising:
acquiring a reception signal obtained by reception of an electromagnetic wave;
calculating, using the reception signal, matrix data indicating complex amplitude at each time and frequency of the reception signal;
calculating, using the matrix data, correlation values between frequency distributions at plural times and to accumulate the correlation values into an autocorrelation value; and
identifying characteristics of an interference signal based on the autocorrelation value.

* * * * *